(12) United States Patent
Chawla et al.

(10) Patent No.: US 8,918,841 B2
(45) Date of Patent: Dec. 23, 2014

(54) HARDWARE INTERFACE ACCESS CONTROL FOR MOBILE APPLICATIONS

(75) Inventors: Deepak Chawla, Ocean, NJ (US); Urs A. Muller, Keyport, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 119 days.

(21) Appl. No.: 13/222,184

(22) Filed: Aug. 31, 2011

(65) Prior Publication Data

US 2013/0055347 A1 Feb. 28, 2013

(51) Int. Cl.
  *H04L 29/06* (2006.01)
  *G06F 21/44* (2013.01)
  *G06F 21/53* (2013.01)
  *H04W 12/08* (2009.01)
  *G06F 21/85* (2013.01)
  *H04W 88/06* (2009.01)

(52) U.S. Cl.
  CPC ............. *G06F 21/44* (2013.01); *G06F 21/53* (2013.01); *H04W 88/06* (2013.01); *H04W 12/08* (2013.01); *G06F 21/85* (2013.01); *H04L 63/0272* (2013.01)
  USPC ........................................................... 726/3

(58) Field of Classification Search
  CPC ......... H04L 63/08; H04L 63/10; H04L 63/20; H04L 12/05; G06F 21/00; G06F 9/52; G06F 9/5016; G06F 9/5077; G06F 9/505; G06F 9/5011; G06F 9/522
  USPC ....................................................... 726/3, 16
  See application file for complete search history.

(56) References Cited

U.S. PATENT DOCUMENTS

| | | | |
|---|---|---|---|
| 826,321 | A | 7/1906 | Eustis |
| 6,223,291 | B1 | 4/2001 | Puhl et al. |
| 6,658,573 | B1 * | 12/2003 | Bischof et al. .................. 726/16 |
| 6,941,455 | B2 | 9/2005 | Aull |
| 6,980,660 | B1 | 12/2005 | Hind et al. |
| 7,016,666 | B2 | 3/2006 | Lauper et al. |
| 7,444,508 | B2 | 10/2008 | Karjala et al. |
| 7,448,080 | B2 | 11/2008 | Karjala et al. |
| 7,509,487 | B2 | 3/2009 | Lu et al. |
| 7,512,802 | B2 | 3/2009 | Minemura |
| 7,529,929 | B2 | 5/2009 | Asokan et al. |

(Continued)

OTHER PUBLICATIONS

Famulari, A.; Hecker, A., "Network-Independent Support for Using Multiple IP Interfaces in Applications," May 18-21, 2011, Network and Information Systems Security (SAR-SSI), 2011 Conference, pp. 1-10.*

(Continued)

*Primary Examiner* — Eleni Shiferaw
*Assistant Examiner* — Nelson Giddins
(74) *Attorney, Agent, or Firm* — Hanley, Flight & Zimmerman, LLC

(57) ABSTRACT

Methods, articles of manufacture, and apparatus for hardware interface access control for mobile applications are disclosed. A disclosed example method includes restricting an application from accessing a set of hardware interfaces of a mobile device, and providing a virtual interface to the application via which the application is to access a first hardware interface in the set of hardware interfaces, the virtual interface provided by a program in a kernel layer of an operating system of the mobile device to control at least one of access or a method of access to the first hardware interface in the set of hardware interfaces, the first hardware interface that is accessible via the virtual interface being unknown to the application.

17 Claims, 9 Drawing Sheets

(56) References Cited

U.S. PATENT DOCUMENTS

| | | | |
|---|---|---|---|
| 7,698,549 B2 | 4/2010 | Thornton et al. | |
| 7,752,320 B2 | 7/2010 | Kappes et al. | |
| 7,761,703 B2 | 7/2010 | Little et al. | |
| 7,797,545 B2* | 9/2010 | Adams et al. | 713/179 |
| 7,822,971 B2 | 10/2010 | Little et al. | |
| 7,900,048 B2 | 3/2011 | Anderson | |
| 8,112,076 B2* | 2/2012 | Lundblade et al. | 455/425 |
| 8,127,146 B2 | 2/2012 | Thom et al. | |
| 8,127,350 B2* | 2/2012 | Wei et al. | 726/15 |
| 8,169,958 B2 | 5/2012 | Torres et al. | |
| 8,239,675 B2 | 8/2012 | Little et al. | |
| 8,245,249 B2 | 8/2012 | Lee | |
| 8,261,321 B2 | 9/2012 | Casey et al. | |
| 8,266,711 B2 | 9/2012 | Holtzman et al. | |
| 8,270,963 B1* | 9/2012 | Hart et al. | 455/418 |
| 8,326,943 B2* | 12/2012 | Chinta et al. | 709/217 |
| 8,340,635 B2* | 12/2012 | Herz et al. | 455/411 |
| 8,427,943 B2* | 4/2013 | Gahm et al. | 370/230 |
| 8,650,620 B2 | 2/2014 | Chawla et al. | |
| 8,719,898 B1 | 5/2014 | Barton et al. | |
| 2003/0196114 A1* | 10/2003 | Brew et al. | 713/201 |
| 2004/0203593 A1 | 10/2004 | Whelan et al. | |
| 2004/0268148 A1 | 12/2004 | Karjala et al. | |
| 2005/0081025 A1 | 4/2005 | Thornton et al. | |
| 2005/0234825 A1 | 10/2005 | Andersson | |
| 2006/0141985 A1* | 6/2006 | Patel et al. | 455/410 |
| 2006/0209821 A1* | 9/2006 | Jung et al. | 370/389 |
| 2006/0259674 A1* | 11/2006 | Dunstan et al. | 710/240 |
| 2006/0277185 A1 | 12/2006 | Sato et al. | |
| 2006/0294105 A1 | 12/2006 | Rosenan et al. | |
| 2007/0043550 A1* | 2/2007 | Tzruya | 703/24 |
| 2007/0079113 A1 | 4/2007 | Kulkarni et al. | |
| 2007/0171921 A1* | 7/2007 | Wookey et al. | 370/401 |
| 2007/0180450 A1* | 8/2007 | Croft et al. | 718/1 |
| 2007/0180509 A1 | 8/2007 | Swartz et al. | |
| 2007/0256127 A1* | 11/2007 | Kraemer et al. | 726/23 |
| 2007/0283324 A1* | 12/2007 | Geisinger | 717/120 |
| 2008/0022413 A1 | 1/2008 | Holtzman et al. | |
| 2008/0034419 A1* | 2/2008 | Mullick et al. | 726/15 |
| 2008/0209221 A1 | 8/2008 | Vennelakanti et al. | |
| 2008/0274716 A1 | 11/2008 | Fok et al. | |
| 2009/0205037 A1* | 8/2009 | Asakura | 726/10 |
| 2009/0210702 A1 | 8/2009 | Welingkar et al. | |
| 2009/0222903 A1 | 9/2009 | Sherkin et al. | |
| 2009/0245184 A1 | 10/2009 | Torres et al. | |
| 2009/0254753 A1* | 10/2009 | De Atley et al. | 713/176 |
| 2009/0254993 A1 | 10/2009 | Leone | |
| 2009/0271844 A1* | 10/2009 | Zhang et al. | 726/2 |
| 2010/0031324 A1* | 2/2010 | Strich et al. | 726/4 |
| 2010/0162240 A1 | 6/2010 | Zhang et al. | |
| 2010/0205436 A1 | 8/2010 | Pezeshki | |
| 2010/0250948 A1 | 9/2010 | Little et al. | |
| 2010/0257578 A1 | 10/2010 | Shukla et al. | |
| 2010/0325427 A1 | 12/2010 | Ekberg et al. | |
| 2011/0003590 A1 | 1/2011 | Yoon et al. | |
| 2011/0162082 A1 | 6/2011 | Paksoy et al. | |
| 2011/0167256 A1 | 7/2011 | Lee et al. | |
| 2011/0191484 A1* | 8/2011 | Babbar et al. | 709/228 |
| 2011/0195698 A1 | 8/2011 | Pearce | |
| 2011/0202755 A1 | 8/2011 | Orsini et al. | |
| 2011/0225284 A1* | 9/2011 | Savolainen | 709/223 |
| 2011/0239270 A1* | 9/2011 | Sovio et al. | 726/1 |
| 2011/0258439 A1 | 10/2011 | Orsini et al. | |
| 2011/0307831 A1* | 12/2011 | Cowan et al. | 715/823 |
| 2012/0002813 A1* | 1/2012 | Wei et al. | 380/270 |
| 2012/0002814 A1* | 1/2012 | Wei et al. | 380/270 |
| 2012/0002815 A1* | 1/2012 | Wei et al. | 380/270 |
| 2012/0005746 A1 | 1/2012 | Wei et al. | |
| 2012/0149330 A1 | 6/2012 | Watson et al. | |
| 2012/0159578 A1 | 6/2012 | Chawla et al. | |
| 2012/0185863 A1* | 7/2012 | Krstic et al. | 718/104 |
| 2012/0185914 A1* | 7/2012 | Delco et al. | 726/1 |
| 2012/0191676 A1* | 7/2012 | Kester et al. | 707/694 |
| 2012/0221955 A1* | 8/2012 | Raleigh et al. | 715/736 |
| 2012/0222084 A1* | 8/2012 | Beaty et al. | 726/1 |
| 2012/0246731 A1* | 9/2012 | Blaisdell et al. | 726/26 |
| 2012/0264375 A1 | 10/2012 | Shankaranarayanan | |
| 2012/0297187 A1 | 11/2012 | Paya et al. | |
| 2012/0311665 A1* | 12/2012 | Lim | 726/1 |
| 2012/0317609 A1* | 12/2012 | Carrara et al. | 726/1 |
| 2013/0031233 A1* | 1/2013 | Feng et al. | 709/223 |
| 2013/0031294 A1* | 1/2013 | Feng et al. | 711/6 |
| 2013/0035059 A1* | 2/2013 | Liu et al. | 455/406 |
| 2013/0042295 A1* | 2/2013 | Kelly et al. | 726/1 |
| 2013/0054962 A1 | 2/2013 | Chawla et al. | |
| 2013/0055347 A1 | 2/2013 | Chawla et al. | |
| 2013/0318345 A1 | 11/2013 | Hengeveld | |
| 2013/0326609 A1 | 12/2013 | Sharkey | |
| 2014/0020062 A1 | 1/2014 | Tumula et al. | |
| 2014/0109173 A1 | 4/2014 | Barton et al. | |
| 2014/0109174 A1 | 4/2014 | Barton et al. | |
| 2014/0109177 A1 | 4/2014 | Barton et al. | |

OTHER PUBLICATIONS

"Hardware Abstraction Layer," Wikipedia, http://en.wikipedia.org/wiki/Hardware_abstraction_layer, accessed on Jul. 3, 2011 (2 pages).

"Virtual Interface," Wikipedia, http://en.wikipedia.org/wiki/Virtual_Interface, accessed on Jul. 3, 2011 (2 pages).

USPTO, "Office Action," issued in connection with U.S. Appl. No. 12/973,665, dated Sep. 13, 2012 (24 pages).

USPTO, "Notice of Allowance," issued in connection with U.S. Appl. No. 12/973,665, dated Mar. 14, 2013 (18 pages).

USPTO, "Office Action," issued in connection with U.S. Appl. No. 13/222,189, dated Nov. 26, 2012 (39 pages).

USPTO, "Office Action," issued in connection with U.S. Appl. No. 13/222,189, dated Jul. 17, 2013 (31 pages).

USPTO, "Office Action," issued in connection with U.S. Appl. No. 13/222,189, dated Nov. 13, 2013 (31 pages).

United States Patent and Trademark Office, "Notice of Allowance", issued in connection with U.S. Appl. No. 13/222,189, dated May 12, 2014 (13 pages).

United States Patent and Trademark Office, "Notice of Allowance", issued in connection with U.S. Appl. No. 13/222,189, dated Jul. 16, 2014 (5 pages).

* cited by examiner

HARDWARE INTERFACE ACCESS CONTROL FOR MOBILE APPLICATIONS

FIELD OF THE DISCLOSURE

This disclosure relates generally to mobile devices and, more particularly, to hardware interface access control for mobile applications.

BACKGROUND

Mobile device security is becoming increasingly important with increases in the spread of malicious applications or other fraudulent code (e.g., malware) targeted towards mobile devices. Many mobile devices also include functionality that enables the mobile devices to connect to more than one type of wireless network. For example, a mobile device with cellular functionality and WiFi functionality may connect to a cellular wireless network and/or a WiFi wireless network. In this example, some applications on the mobile device (e.g., voice communications, global positioning system (GPS)-related applications, service provider-related functions) may connect to the cellular network while other applications (e.g., web browsing, text messaging, media streaming) may connect to the WiFi network. In at least some prior mobile devices, the applications on the mobile device may access a wireless network without a user knowing which wireless network the applications are utilizing. Moreover, in at least some prior mobile devices, applications may have uncontrolled access to the network and/or other hardware interfaces of the mobile device.

DETAILED DESCRIPTION

Figure 1:
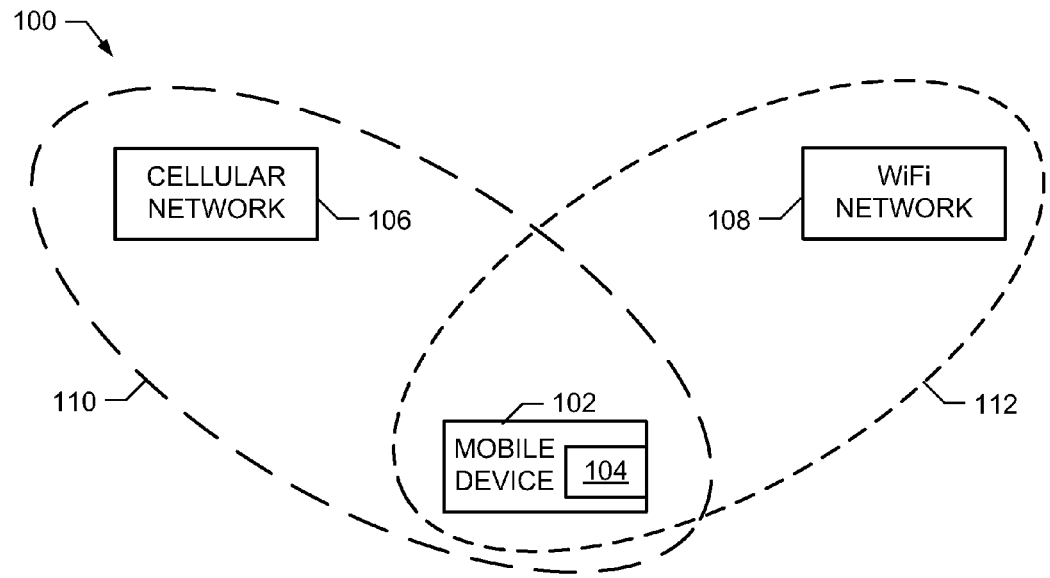
FIG. 1 is a schematic illustration of an example wireless environment that includes a mobile device with an app policy engine.

Example methods, articles of manufacture, and apparatus for hardware interface access control for mobile applications are disclosed. A disclosed example method includes restricting a first application from accessing a set of hardware interfaces of a mobile device. The example method also includes providing a virtual interface to the first application via which the first application is to access a particular hardware interface in the set of hardware interfaces. The virtual interface is provided by a second application integrated in a kernel layer of an operating system of the mobile device. Furthermore, the particular hardware interface that is accessible via the virtual interface is unknown to the first application.

A disclosed example mobile device includes a set of hardware interfaces, and an example policy engine (e.g., an example app policy engine or application policy engine) to determine whether a first application is authorized to access one or more of the set of hardware interfaces. The mobile device further includes an example hardware access engine to restrict the first application from accessing the set of hardware interfaces. The hardware access engine also is to provide a virtual interface to the first application via which the first application is to access a particular hardware interface in the set of hardware interfaces. The virtual interface is provided by a second application integrated in a kernel layer of an operating system of the mobile device. Additionally, the particular hardware interface that is accessible via the virtual interface is unknown to the first application, but is one of the one or more hardware interfaces the first application is permitted to access.

Mobile device security is becoming important as software worms, viruses, and other malicious code are designed to target mobile devices. Mobile devices include, for example, any laptop, smartphone, cellular phone, computing pad, personal digital assistant, tablet personal computer, personal communicator, etc. Because many mobile devices have relatively small memories, these mobile devices typically do not include anti-malware protection. However, many mobile devices are primarily used to access data and/or communications from servers via a wireless network. In some instances, malicious code may be embedded within data, which then penetrates an operating system of a mobile device. In many instances, malicious code can expose sensitive information stored on a mobile device. In other instances, malicious code can use the mobile device as a launching pad to propagate to other mobile devices. In yet other instances, the malicious code may use the mobile device as a host to perform denial of service attacks on web servers and/or wireless networks.

To prevent and/or limit a mobile device from receiving malicious code, some mobile devices include a VPN client that encrypts, keys, and/or authenticates data and/or communication transmissions through a wireless network. In many instances, a mobile device uses a VPN client to create a secure connection to a host server located in a private enterprise network or a carrier network (e.g., a wireless network). The VPN client establishes a relatively secure virtual tunnel and/or virtual circuit from a mobile device to a host server and/or network.

However, some issues with existing VPN clients can expose mobile devices to malicious code. In some instances, malicious code can bypass a VPN client on a mobile device. For example, some mobile devices are configured to connect to more than one wireless network. These mobile devices grant applications access to connect (e.g., communicatively couple) to the wireless networks via corresponding wireless hardware interfaces. In many of these instances, the mobile devices may enable any application to connect to a wireless network without prompting a user for permission. In these instances, a malicious application may bypass a VPN connecting to a first wireless network and connect to a second wireless network instead. In this way, the malicious application can bypass the VPN and any corresponding firewalls on the mobile device by, for example, accessing the second wireless network at the link layer of the mobile device (e.g., an application programming interface (API) for processing network traffic).

In other instances, user installed applications may not be configured to access a wireless network through a VPN client. A malicious application may use the connections of these applications to bypass the VPN. Additionally, some mobile device users may disable and/or uninstall VPN clients, thereby exposing the mobile devices to potentially malicious code. In yet other instances, malicious applications and/or code can utilize tools and/or components that are used by VPN clients to protect a mobile device. The malicious applications can utilize the tools and/or components to connect to a wireless network in parallel with the VPN client, thereby bypassing the security of the VPN client.

Some example methods, apparatus, and articles of manufacture described herein integrate an app (e.g., application) policy engine with a kernel of an operating system of a mobile device to control which application on the mobile device can be executed and/or to control which of the applications are authorized to access device interfaces and/or network interfaces of the mobile device. These example methods, apparatus, and articles of manufacture described herein interact with an application execution manager of an operating system, a certificate validation processor, and/or a mandatory access control (MAC) module to enforce execution of device and/or network interface access policies. Additionally or alternatively, some example methods, apparatus, and articles of manufacture described herein employ a hardware access engine to control access by applications to hardware interfaces of the mobile device. Thus, the example methods, apparatus, and articles of manufacture described herein block applications and/or services that are not authorized and/or certified from accessing security sensitive interfaces including, for example, a wireless network, a VPN, and/or host service platform.

Some example methods, apparatus, and articles of manufacture described restrict application access to hardware interfaces, such as device and/or network interfaces, of the mobile device and, instead, provide a virtual interface to control application access to these hardware interfaces. Additionally or alternatively, some example methods, apparatus, and articles of manufacture described herein restrict application execution and/or restrict application access to device and/or network interfaces by assigning a process identifier to each application and/or service on a mobile device. These example methods, apparatus, and articles of manufacture use the process identifiers to determine if each of the applications is authorized to be executed on the mobile device and/or to access requested device interfaces and/or network interfaces. The example methods, apparatus, and articles of manufacture described herein can determine which applications and/or services are authorized to be executed on the device by checking a digital application certificate provided by a certificate authority.

A certificate authority may provide a digital certificate for each application or, alternatively, provide a digital certificate for more than one of the authorized applications on a mobile device. A list of certificate authorities that are recognized by a mobile device as valid authorities to sign applications may be preconfigured and/or hard coded into an example app policy engine (also referred to as an application policy engine). Alternatively, the list of certificate authorities may be provided through a network via a local memory module of the mobile device such as, for example, a subscriber identity module (SIM) card. In examples where a digital certificate is assigned to each application, the example methods, apparatus and articles of manufacture described herein can use the digital certificate to identify that the corresponding application is authorized to be executed on the mobile device. The digital certificate may also indicate which device interfaces and/or network interfaces of the mobile device the application is authorized to access.

An application, service, and/or function on a mobile device includes any software and/or firmware routine and/or algorithm that performs a function within a mobile device. An application and/or a service includes, for example, a messaging application, an e-mail service, a social network application, a gaming application, a web browsing application, a word processing application, a database management application, etc. In some disclosed examples, when an authorized application is executed on a mobile device, the app policy engine configures the example MAC module to grant only the application access to device interface(s) and/or network interface(s) on the mobile device. In this manner, the example app policy engine manages which applications with process identifiers are granted permission to interfaces of the mobile device. The example MAC module may then enable authorized applications and/or services to access the device and/or network interfaces and block and/or restrict unauthorized applications from accessing those interfaces.

A MAC module provides access control between an operating system layer and device interfaces (e.g., an interface to a camera, a microphone, a memory card, etc.) and/or network interfaces (e.g., network interface cards (NICs)) of a mobile device. Network interfaces may be communicatively coupled to a network and/or server. By providing access control, a MAC module determines which applications and/or services may transmit and/or receive data from networks and/or servers via the network interfaces. By providing a MAC module with a list of authorized applications for a network that identifies which device and/or network interfaces the applications are authorized to access, example methods, apparatus, and articles of manufacture described herein can create a controlled environment for application execution and/or application access to device and/or network interfaces, thereby preventing unauthorized applications from being executed on a mobile device and/or from applications improperly accessing the device and/or network interfaces. In this manner, example methods, apparatus, and articles of manufacture described herein ensure that application execution and/or device and/or network interface access privileges correspond to specified polices of a certificate authority.

Example methods, apparatus, and articles of manufacture described herein also enable applications and/or services that are authorized and/or certified (e.g., signed) in a digital certificate by a host service platform (e.g., a certificate authority) to access physical network interfaces of a network, thereby blocking malicious and/or unauthorized applications from executing on a mobile device. Further, some example methods, apparatus, and articles of manufacture described herein permit exclusive privileges to be granted to a specific application (e.g., a VPN client). By granting relative higher privileges to, for example, a VPN client, other applications with relatively lower privileges have to abide by the privileges granted to the VPN client. For example, a VPN client may have exclusive authorized access to a wireless network interface. Other certified and/or authorized applications on the mobile device with relatively lower privileges are forced to go through the VPN to obtain access to the wireless network.

In the interest of brevity and clarity, throughout the following disclosure, reference will be made to an example wireless environment 100 of FIG. 1. However, the methods, articles of manufacture, and apparatus described herein to control mobile device application access to wireless networks are applicable to other types of networks constructed using other network technologies, topologies and/or protocols.

FIG. 1 shows a schematic illustration of the example wireless environment 100 that includes a mobile device 102 with an app policy engine 104. The mobile device 102 may include any type of wireless and/or mobile device capable of communicatively coupling to a wireless network including, for example, a laptop, a smartphone, a cellular phone, a computing pad, a personal digital assistant, a tablet personal computer, and/or a personal communicator. In other examples, the mobile device 102 may include any type of computing device that can communicatively couple to a wireless and/or a wired network including, for example, a workstation, a personal computer, a server, and/or a processor. While FIG. 1 shows the mobile device 102, in other examples, FIG. 1 may include additional mobile devices.

In the illustrated example, the mobile device 102 is capable of communicatively coupling to a cellular network 106 and a WiFi network 108. The example networks 106 and 108 include any number and/or types of routers, switches, servers, etc. to enable communications (e.g., packet-based data) between the mobile device 104 and a packet switched network (e.g., the Internet). Further, the networks 106 and 108 may utilize and/or conform to any routing and/or communication protocols. For example, the cellular network 106 may include components, network elements, and/or controllers that conform to the $3^{rd}$ Generation Partnership Project (3GPP) Long Term Evolution (LTE) wireless communication standard, the General Packet Radio Service (GPRS) for second generation (2G) protocol, the Wideband-Code Division Multiple Access (W-CDMA)-based third generation (3G) protocol, the Universal Mobile Telecommunication System (UMTS) protocol, and/or the Global System for Mobile Communications (GSM) protocol. In other examples, the wireless environment 100 may include other wireless protocols compatible with the mobile device 102 including, for example, Bluetooth IP and/or IEEE 802.11 wireless local area network (WLAN).

In the example of FIG. 1, the example mobile device 102 is within a coverage area 110 of the cellular network 106 and a coverage area 112 of the WiFi network 112. By being within the coverage areas 110 and 112, applications within the mobile device 102 may communicatively couple to either of the wireless networks 106 and 108. To manage which of the wireless networks 106 and 108 the applications may access, the example mobile device 102 includes the app policy engine 104.

A prior mobile device without the app policy engine 104 may establish a VPN link to a VPN within, for example, the cellular network 106. In such a prior mobile device, applications that are configured to connect to the VPN on the mobile device may transfer data with the VPN. However, other applications (including malicious code) may bypass the VPN and access the WiFi network 108. By being able to bypass the VPN, applications may transfer data through the WiFi network 108 to known and/or unknown destinations without a user of the mobile device 102 knowing of the connection to the WiFi network 108.

The example app policy engine 104 establishes a VPN tunnel within the mobile device 102 so that application access to the cellular network 106 is restricted at the device interface and/or the network interface (e.g., NIC) level. By restricting application access to the hardware interface level (e.g., locking a physical interface of the mobile device 102), a MAC module within the mobile device 102 can determine which applications are to be granted access to a VPN within the cellular network 106 and which applications are to be blocked and/or not granted access to the VPN. In this manner, the example app policy engine 104 ensures that only authorized applications are able to connect to a network while preventing unauthorized applications from transmitting and/or receiving data.

Figure 2:
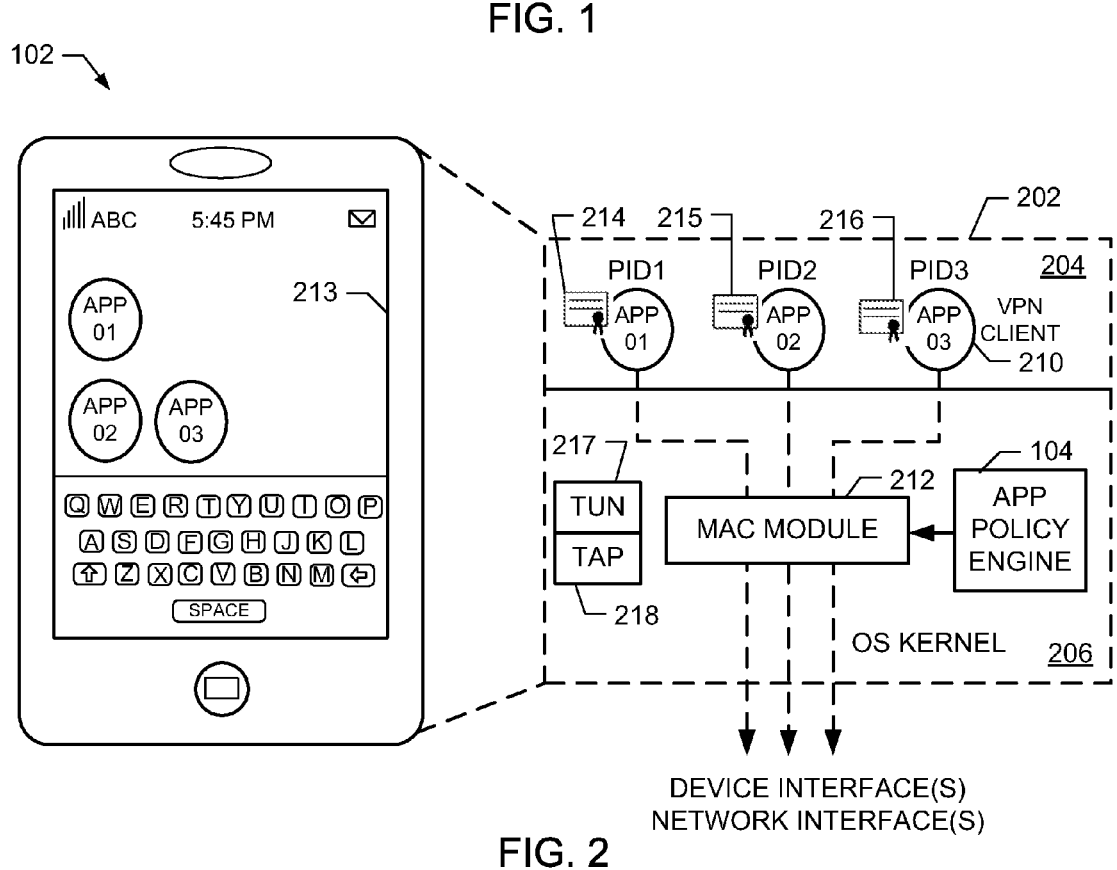
FIG. 2 shows a block diagram of an example mobile device of FIG. 1 including the example app policy engine of FIG. 1 implemented within a device operating system (OS) platform.

FIG. 2 shows the example mobile device 102 of FIG. 1 including the example app policy engine 104 of FIG. 1 implemented within a device OS platform 202. The device OS platform 202 includes layers 204-206 for operating applications APP 01-03 within the mobile device 102. In other examples, the mobile device 102 and/or the device OS platform 202 may include additional or fewer applications. The example device OS platform 202 of the illustrated example may be implemented in any type of operating system including, for example, Microsoft Windows compatible systems, Mac OS compatible systems, and/or Linux compatible systems.

The application layer 204 includes software and/or firmware routines, algorithms, and/or programs that are configured to perform at least one predetermined function. In the illustrated example, the application layer 204 includes the applications APP 01-03. In this example, APP 03 is a VPN client 210 and the applications APP 01-02 may include any type of software application.

The example VPN client 210 within the application layer 204 enables the applications APP 01-02 to securely communicatively couple to a VPN within, for example, the cellular network 106. Through the exchange of encrypted registration messages with a VPN, the example VPN client 210 establishes a virtual connection (e.g., a virtual circuit) through a public network (e.g., the wireless network 106). The VPN client 210 uses this virtual connection to relatively securely transmit and receive data from servers, processors, and/or computers within a private network of a host service platform connected to the VPN. In this manner, the applications APP 01-02 may transmit and/or receive data securely with a VPN via the VPN client 210 and a MAC module 212.

In the example of FIG. 2, the mobile device 102 includes a user interface 213 for displaying the applications APP 01-03 including the VPN client 210. A user of the mobile device 102 may connect to a VPN by selecting the VPN client 210 (or an icon representing the VPN client 210) displayed within the user interface 213. A user may execute the certified applications APP 01-02 to transmit and/or receive data from a VPN by selecting the applications APP 01-02 (or an icon representing the applications APP 01-02) displayed within the user interface 213.

To connect to a VPN, each of the applications APP 01-03 includes respective digital certificates 214-216 (e.g., an application, and/or electronic certificate). The example digital certificates 214-216 certify that the certificates 214-126 belong to a user, organization, server, and/or other entity. The digital certificates 214-216 may also be used to establish an encryption scheme and/or security protocol with a VPN. The VPN client 210 connects to a VPN by transmitting the certificate 216 to a VPN authorization agent that grants access to a VPN. The VPN authorization agent verifies the credentials within the certificate 216 and provides the VPN client 210 access to a VPN. After establishing a connection to a VPN, the VPN client 210 encrypts data from the applications APP 01-02 to transmit to the VPN and decrypts data from the VPN for the applications APP 01-02. In many instances, the digital certificates 214-216 are provided by a certificate authority and/or a service administrator (e.g., such as an administrator of a VPN).

In the example of FIG. 2, the digital certificates 214-216 includes a list of device interfaces and/or network interfaces that are authorized to be accessed by the applications APP 01-03. In some examples, a service administrator or the like may only allow certain applications and/or certain types of applications to access device and/or network interfaces. For example, a service administrator may only allow certain applications that have trusted security properties, applications that are business appropriate, and/or applications that are relevant to the purpose of a VPN. As an illustrative example, a service administrator may specify in the certificates 214 and 216 that the application APP 01 and the VPN client 210 are authorized to access a VPN via a network interface. Further, the service administrator may specify within the digital certificate 216 that the VPN client 210 is to have relatively greater privileges to access network interfaces and specify within the certificates 214 and 215 that the applications APP 01-02 are to have relatively fewer privileges to access network interfaces. The relatively fewer privileges may cause the applications APP 01-02 to go through the VPN client 210 to access the network interfaces.

In other examples, a user of the mobile device 102 may request from a service administrator that certain applications are to have access to a VPN. For example, a user may request to have a digital certificate (e.g., the digital certificate 215) assigned to the application APP 02 by sending a request to a certificate authority. The service administrator and/or a certificate authority may respond by providing the digital certificate 215 to reflect that the application APP 02 is authorized to access a VPN. Alternatively, the service administrator and/or the certificate authority may assign a single digital certificate that specifies which of the applications APP 01-03 may be executed on the mobile device 102 and/or specify which interfaces of the applications APP 01-03 may access.

The example operating system (OS) kernel layer 206 provides services to execute the applications APP 01-02 and the VPN client 210 within the application layer 204. For many hardware functions (e.g., input functions, output functions, memory allocation, and/or wireless communication functions) of the mobile device 102, the OS kernel layer 206 functions as an interface so that the hardware functions are interpreted properly by the applications APP 01-02 and the VPN client 210. The example OS kernel layer 206 includes the app policy engine 104 for interfacing between the VPN client 210 and the MAC module 212.

The example OS kernel layer 206 may also bridge (e.g., interface) the application layer 204 with a hardware layer (not shown) for processing data from the applications APP 01-03. The hardware level includes device interface(s) and network interface(s) of the mobile device 102. The example OS kernel layer 206 in the illustrated example manages data from the application layer 204 for transmission to the networks 106 and 108 via, for example NICs (e.g., wireless network cards). The example OS kernel layer 206 also propagates data received from the networks 106 and 108 to the appropriate applications APP 01-03.

In addition to the MAC module 212, the example OS kernel layer 206 includes a network tunnel 217 and a network tap 218. Together, the example MAC module 212, the example network tunnel 217, and the example network tap 218 operate at the OS kernel level 206 to provide security prior to data reaching the applications APP 01-03 within the application layer 204. While the example OS kernel layer 206 includes the MAC module 212, the network tunnel 217, and the network tap 218, the OS kernel layer 206 may include additional or fewer components to establish and/or manage VPN security.

The example network tunnel (TUN) 217 creates a VPN tunnel through the device OS platform 202 and/or the mobile device 102 by encapsulating data within a packet data payload conforming to a protocol of a packet switched network. In this manner, the network tunnel 217 enables communications to propagate securely from, for example, the VPN client 210 to a destination via a VPN within, for example, the cellular network 106. The example network tunnel 217 may create a virtual circuit and/or a VPN tunnel upon the VPN client 214 receiving permission to connect to a VPN.

The example network tap 218 monitors data propagating within a VPN tunnel to detect a network intrusion from an unauthorized third party. The example network tap 218 may also be used for Voice over Internet Protocol (VoIP) recording to monitor a Quality of Service (QoS) for a VPN connection. The example network tap 218 may operate in conjunction with the example network tunnel 217 to provide relatively secure data communications through a VPN tunnel.

The example MAC module 212 of FIG. 2 provides access control to hardware interface(s) of the wireless device 102. Specifically, the example MAC module 212 provides access control for the applications APP 01-03 to connect to wireless NICs, which provide a wireless connection to, for example, the wireless networks 106 and 108. The example MAC module 212 may also determine which of the applications APP 01-03 maybe executed and/or operated on the mobile device 102 by restricting unauthorized applications from access device interfaces of the mobile device 102. For example, the MAC module 212 may prevent unauthorized applications from accessing a microphone and enabling authorized telephony applications to access the microphone. In this example, the MAC module 212 prevents any unauthorized applications (e.g., malware) from secretly accessing the microphone and recording, for example, confidential conversations.

In the illustrated example of FIG. 2, the MAC module 212 includes an interface to an NIC configured to connect to the cellular network 106 and an interface to an NIC configured to connect to the WiFi network 108. For example, communications approved by the MAC module 212 for the cellular network 106 are routed through the appropriate cellular interface to the wireless NIC configured for the wireless network 106. In other examples, the MAC module 212 may include additional or fewer interfaces to other hardware interfaces of the wireless device 102.

In the example of FIG. 2, the app policy engine 104 configures the MAC module 212 to grant specific applications access to a VPN and/or host service platform via one of the wireless networks 106 and 108. To grant certain applications access, an operating system within the OS layer 206 assigns a unique process identifier to each of the applications APP 01-03. For example, the operating system assigns process identifier PID1 to the application APP 01 and assigns process identifier PID3 to the VPN client 210. The process identifiers PID1-3 are numbers and/or names assigned to the respective applications APP 01-03. An operating system, the MAC module 212, and/or the app policy engine 104 may use the process identifiers PID1-3 to locate, identify, and/or access the appropriate applications APP 01-03. In some instances, the process identifiers PID1-3 may be used in a function call to access the applications APP 01-03.

The example app policy engine 104 uses the process identifiers PID1-3 as a reference for the MAC module 212 to indicate which of the applications APP 01-03 are authorized to access a VPN. For example, after the process identifiers PID1-3 are assigned to the respective applications APP 01-03, the app policy engine 104 checks the digital certificates 214-216 to determine which of the applications APP 01-03 are authorized to access device and/or network interfaces of the mobile device 102. The example app policy engine 104 sends an instruction to the MAC module 212 with the process identifiers of the applications APP 01-03 that are authorized to access a VPN. The example MAC module 212 stores the allowed process identifiers to later determine if an application requesting to access a VPN, a wireless network, and/or a host service platform is authorized.

In some examples, the app policy engine 104 may provide the MAC module 212 with a list of authorized applications upon the mobile device 102 requesting to connect to a VPN. In other examples, the app policy engine 104 may detect that one of the applications APP 01-03 is attempting to transmit data to one of the wireless networks 106 and 108. In response to detecting the attempted transmission, the app policy engine 104 determines if the application APP 01 is authorized to access a network interface to transmit the data by checking the certificate 214 and sending an instruction to the MAC module 212 to allow the application APP 01 to access the wireless network 106 and/or 108 if the application APP 01 is authorized. In these other examples, the app policy engine 104 provides the MAC module 212 application access permission as each of the applications APP 01-03 attempts to access a network. In yet other examples, the app policy engine 104 may provide a list of authorized process identifiers to the MAC module 212 periodically and/or after the VPN client 210 receives updated and/or new digital certificates.

In examples where the mobile device 102 includes more than one VPN client, the app policy engine 104 may identify for the MAC module 212 which of the applications APP 01-02 are authorized to access each of the VPNs via respective network interfaces. For example, the application APP 01 may be authorized to access a first VPN via the cellular network 106 and the application APP 02 may be authorized to access a second VPN via the WiFi network 108. In this example, the app policy engine 104 instructs the MAC module 212 to allow the application APP 01 to access an NIC for the cellular network 106 and instructs the MAC module 212 to allow the application APP 02 to access an NIC for the WiFi network 108. Thus, the app policy engine 104 prevents the MAC module 212 from allowing the application APP 01 to access the VPN on the WiFi network 108 and prevents the MAC module 212 from allowing the application APP 02 from accessing the VPN on the cellular network 106. Further, in examples where more than one VPN client may connect to respective VPNs through, for example, the cellular network 106, the app policy engine 104 ensures that the appropriate applications connect to the respective VPNs through the appropriate VPN client by having the MAC module 212 restrict applications from accessing a VPN on the cellular network 106 that are not authorized to access the VPN.

Figure 3:
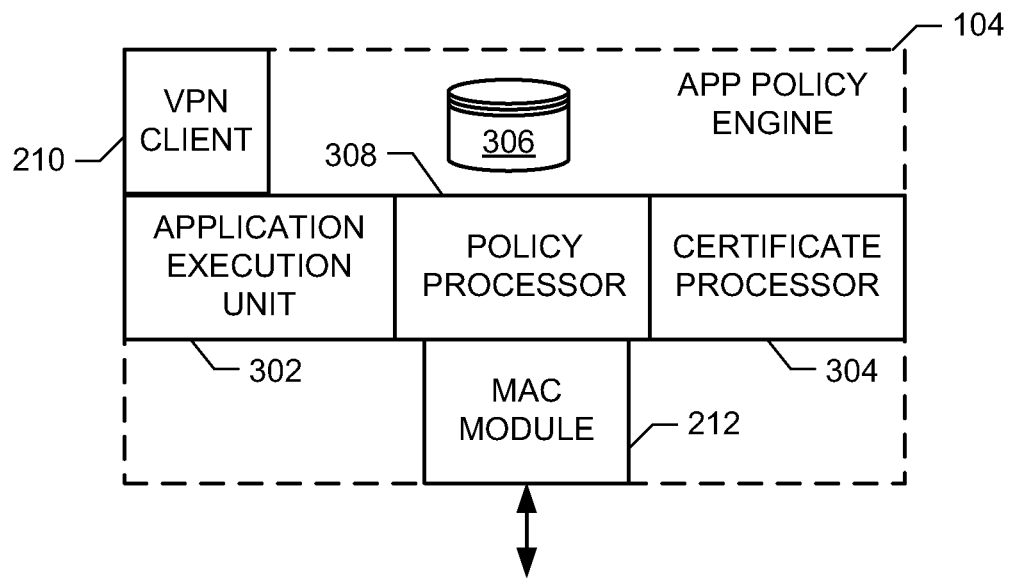
FIG. 3 shows a block diagram of the example app policy engine of FIGS. 1-2.

FIG. 3 shows a functional diagram of the example app policy engine 104 of FIGS. 1-2. The example app policy engine 104 may be implemented within, for example, the OS kernel layer 206 as described in conjunction with FIG. 2. In other examples, the app policy engine 104 may be implemented by any processor, controller, microcontroller, hardware, and/or firmware within the device OS platform 202 and/or within more generally, the mobile device 102. While the MAC module 212 and the VPN client 210 are shown as being included within the app policy engine 104, in other examples, the VPN client 210 and/or the MAC module 212 may be external to the app policy engine 104.

The example app policy engine 104 includes application execution unit 302 to interface within an operating system of the mobile device 102. The example application execution unit 302 also assigns process identifiers (e.g., process IDs) to each of the applications (e.g., the applications APP 01-03) within the mobile device 102. The example MAC module 212 uses the process identifiers to grant and/or restrict application access to device and/or network interfaces of the mobile device 102.

Further, the application execution unit 302 may determine which applications may be executed on the mobile device. For example, the app policy engine 104 may receive an indication that an application is attempting to operate and/or initialize. The application execution unit 302 determines if the application is associated with a digital certificate and that indicates the application may be executed. If the digital certificate indicates the application may be executed, the example application execution unit 302 enables the application to operate (e.g., execute) on the mobile device 102.

To identify privileges of applications, the example app policy engine 104 includes a certificate processor 304. The example certificate processor 304 requests to access, for example, the certificate 214 stored on the mobile device 102. The certificate processor 304 reads the certificate 214 to determine if the associated application APP 01 is authorized to be executed, access device and/or network interfaces, access a VPN, access a wireless network, and/or access a host service platform. In some instances the certificate processor 304 identifies applications by a name included within a digital certificate and references the name to determine the corresponding application within the application layer 204. In other instances, the certificate processor 304 examines a digital certificate for any other identifying information (e.g., file names, application metadata, application identifiers, etc.) to locate a corresponding application with the application layer 204.

After determining which applications are authorized to be executed, access device and/or network interfaces, access a VPN, access a wireless network, and/or access a host service platform, the example certificate processor 304 stores an identifier of the authorized applications to a database 306. The example certificate processor 304 may create a separate group of authorized applications within the database 306 for each device and/or network interface. Additionally, the certificate processor 304 may group authorized applications within the database 306 based on a relatively amount of granted privileges.

The certificate processor 304 may also query the application execution unit 302 for process identifiers assigned to the applications and store the respective process identifiers with the identifiers of the authorized application to the database 306. In this manner, the certificate processor 304 maintains a group of applications that are authorized to be executed, access device and/or network interfaces, access a VPN, access a wireless network, and/or access a host service platform. The database 306 may be implemented by Electronically Erasable Programmable Read-Only Memory (EEPROM), Random Access Memory (RAM), Read-Only Memory (ROM), and/or any other type of memory.

In some examples, the certificate processor 304 may identify applications that are unauthorized to be executed, access device and/or network interfaces, access a VPN, access a wireless network, and/or access a host service platform. In these examples, the certificate processor 304 stores the process identifies of these applications to the database 306. Further, the certificate processor 304 may periodically query the VPN client 210 (and/or a SIM card of the mobile device 102) to determine if new and/or updated versions of digital certificates are available. In other examples, the VPN client 210 may notify the certificate processor 304 that new and/or modified certificates have been received. In instances where digital certificate have been updated and/or replaced, the certificate processor 304 updates the database 306 with identifiers of authorized applications.

To provide the MAC module 212 of FIG. 2 with instructions specifying authorized applications, the example app policy engine 104 includes a policy processor 308. The example policy processor 308 of FIG. 3 accesses the database 306 to identify privileges of applications. The example policy processor 308 then configures the MAC module 212 by providing the list of process identifiers that correspond to the authorized applications.

The example policy processor 308 of the illustrated example may provide the MAC module 212 with a list of authorized applications periodically, upon a request to connect to a wireless network, upon a request to execute, upon a request to connect to a VPN, and/or host service platform, upon an application accessing a wireless network, upon powering of the mobile device 102, upon updating of digital certificate(s), and/or upon a request from the MAC module 212. In examples where the MAC module 212 does not include a list of authorized applications, the policy processor 308 responds to queries from the MAC module 212 asking an application is authorized to be executed and/or access device and/or network interfaces of the mobile device 102. In these examples, the policy processor 308 determines which applications are authorized by accessing the database 306 and searching for privileges associated with process identifiers of the applications.

The example policy processor 308 of FIG. 3 communicatively couples the app policy engine 104 to the MAC module 212. The example policy processor 308 receives instructions including process identifiers corresponding to authorized applications and transmits the instructions to the MAC module 212. Further, the policy processor 308 may detect that a VPN tunnel has been established via, for example, the VPN client 210. Alternatively, the MAC module 212 may inform the policy processor 308 that a VPN tunnel has been created. In response to the policy processor 308 receiving an indication of a VPN tunnel, the policy processor 308 may transmit instructions to the MAC module 212 providing a list of authorized applications.

In some examples, the VPN client 210 creates a VPN tunnel though the device OS platform 202 to device and/or network interfaces of the mobile device 102 upon detecting and/or receiving an indication that a user has selected to connect to a VPN and/or host service platform. To create a VPN tunnel, the VPN client 210 may instruct the network tunnel 217 to establish a VPN tunnel from the VPN client 210 to a wireless hardware interface of the mobile device 102 via the MAC module 212. The VPN client 210 may also instruct the access controller 408 to send instructions to the MAC module 212 to identify authorized applications that can transmit and/or receive communications via the VPN tunnel.

Figure 4:
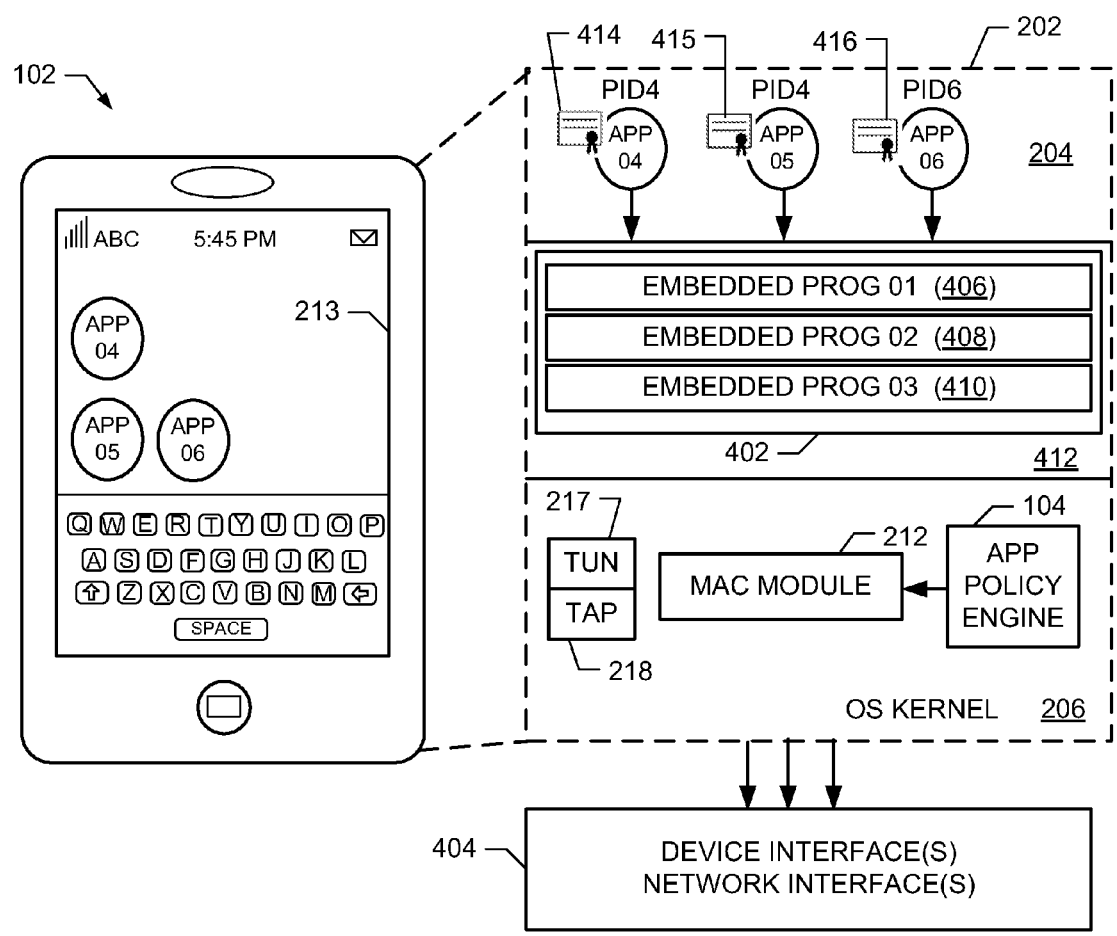
FIG. 4 shows a block diagram of the example mobile device of FIG. 1 also including an example hardware access engine integrated in the device OS platform.

FIG. 4 shows another example of the mobile device 102 that further includes an example hardware access engine 402 integrated in the device OS platform 202. Although the example of FIG. 4 illustrates both the hardware access engine 402 and the app policy engine 104 as being included in the mobile device 102, other examples can include the hardware access engine 402 without the app policy engine 104. The example of FIG. 4 includes many elements in common with the example of FIG. 2. As such, like elements in FIGS. 2 and 4 are labeled with the same reference numerals. The detailed descriptions of these like elements are provided above in connection with the discussion of FIG. 2 and, in the interest of brevity, are not repeated in the discussion of FIG. 4.

The example mobile device 102 of FIG. 4 includes the hardware access engine 402 to control application access to any, some or all of the hardware (or physical) interfaces 404 of the mobile device 102. Additionally or alternatively, the hardware access engine 402 can control the methods by which application(s) can access any, some or all of the hardware (or physical) interfaces 404 of the mobile device 102. The hardware interfaces 404 for which the hardware access engine 402 provides access control can include, for example, one or more NICs that enable the mobile device 102 to connect to the networks 106 and/or 108, one or more device interfaces, such as one or more memory interfaces to one or more storage devices, a microphone interface to a microphone, a speaker interface to a speaker, a camera interface to a camera, a keypad interface to a keypad, a touchscreen interface to a touchscreen, etc. The hardware access engine 402 controls access to these one or more hardware interfaces 404 by preventing one or more of the applications APP 04-06 that execute in the application layer 204 (e.g., which may be similar to or different from the applications APP 01-03 of FIG. 2) from accessing these hardware interfaces 404 directly. Instead, hardware access engine 402 provides a virtual interface(s) through which one or more of the applications APP 04-06 are permitted to access the one or more hardware interfaces 404, as described in greater detail below. Additionally or alternatively, the hardware access engine 402 can control access to one or more of the hardware interfaces 404 by one or more applications, or one or more portions of an application, executing in the network (e.g., such as one or more cloud-based application) and that can interact with the hardware interfaces 404 of the mobile device 102.

In the illustrated example, the hardware access engine 402 is implemented by a set of example embedded programs 406, 408 and 410 integrated or otherwise included in an execution layer 412 of the OS kernel 206 (also referred to as the OS kernel execution layer 412). The embedded programs 406, 408 and 410 (or embedded progs 406, 408 and 410, or built-in progs 406, 408 and 410) are referred to a programs instead of applications to avoid confusing them with the applications APP 04-06 that execute in the application layer. In some examples, because the embedded programs 406, 408 and 410 are integrated in the OS kernel execution layer 412, the embedded programs 406, 408 and 410 can be modified, added and/or removed only by upgrading or downgrading the version of the OS kernel 206 executing in the mobile device 102. In the example of FIG. 4, each of the embedded programs 406, 408 and 410 provides access control for a respective set (e.g., class) of hardware interfaces 402 of the mobile device 102. For example, the embedded program 406 may be an example embedded VPN client 406 that provides access control for a set of NICs included in the mobile device 102. Additionally or alternatively, the embedded program 408 may be an example embedded file encryption system (FES) client 408 that provides access control for a set of memory interfaces for interfacing with a respective set of memory devices included in the mobile device 102. Additionally or alternatively, the embedded program 410 may be an example embedded driver client 410 that provides access control for a set of user interfaces, such as microphone interface, a speaker interface, a keypad interface, a touchscreen interface, a camera interface, etc., or any combination thereof.

In some examples, OS kernel 206 and/or the hardware access engine 402 (or an appropriate one of the embedded programs 406-410 included in the hardware access engine 402), prevents the applications APP 04-06 from accessing a set of hardware interfaces 404 (e.g., such as a set of NICs and/or a set of memory interfaces, etc.) and, instead, provides one virtual interface to this set of hardware interfaces 404 that is based on (e.g., tailored to) a set of access permissions determined for the applications APP 04-06. For example, when the hardware access engine 402 determines that the application APP 04 is attempting to (e.g., requesting access to or a list of) a set of hardware interfaces 404, the OS kernel 206 and/or hardware access engine 402 prevents the application APP 04 from accessing this set of hardware interfaces 404 directly but, instead, provides a virtual interface that enables the application APP 04 to access a particular hardware interface in this set of hardware interfaces 404 in a particular manner (e.g, via a particular access method). The particular hardware interface accessible via the virtual interface (e.g., and the method of accessing the hardware interface) is configured (e.g., selected) by the hardware access engine 402 based on access permissions determined for the application APP 04. In some examples, the particular hardware interface that the hardware access engine 402 makes accessible to the application APP 04 via the virtual interface (as well as, for example, any other processing performed between the virtual and physical interfaces) is unknown to the application APP 04. In other words, the abstraction from the set of hardware interfaces 404 to a single virtual interface provided by the hardware access engine 402 is transparent to the application APP 04. Such abstraction can prevent unauthorized (e.g., malicious) applications from gaining direct access to the hardware interfaces 404 of the mobile device 102.

In some examples, the hardware access engine 402 utilizes the processing performed by the app policy engine 104 described above to determine the hardware access permissions for the applications APP 04-06. In such examples, and as described in greater detail above in connections with FIGS. 2 and 3, the app policy engine 104 can process digital certificates 414-416 (which may be similar to or different from the certificates 214-216 of FIG. 2) associated respectively with the applications APP 04-06 to determine which, if any, of the hardware interfaces 404 the applications APP 04-06 have permission to access (e.g., by processing a list of authorized interfaces included in the digital certificates 414-416). For example, the app policy engine 104 can process the certificate 414 associated with the application APP 04 to determine which, if any, of a set of hardware interfaces 404 the certificate 414 indicates that the application APP 04 has permission to access. If app policy engine 104 determines that the application APP 04 does not have permission to access any of the set of hardware interfaces 404, the hardware access engine 402 prevents the application APP 04 from accessing any of these hardware interfaces by not providing a virtual interface for accessing this set of hardware interfaces 404 to the application APP 04. However, if the policy engine 104 determines that the application APP 04 does have permission to access at least one of the set of hardware interfaces 404, the hardware access engine 402 provides a virtual interface to the application APP 04 that is configured, based on the application's determined access permissions, to provide access to a particular one of set of hardware interfaces 404 that the application APP 04 is permitted to access (e.g., with the particular hardware interface that is accessible via the virtual interface being unknown to the application APP 04, as described above).

Because different application APP 04-06 may have different access permissions, the particular hardware interface in a set of hardware interfaces 404 that is accessible via the virtual interface provide by the hardware access engine 402 may be different for different applications APP 04-06. Also, depending on the access permissions and capabilities of a particular application APP 04-06, the virtual interface provided by the hardware access engine 402 to a particular application APP 04-06 may enable access to more than one of the hardware interfaces included in the set of hardware interfaces 404 the particular application APP 04-06 is attempting to access.

For example, consider an example scenario in which the embedded program 406 included in the hardware access engine 402 corresponds to an embedded VPN client 406 that is to provide access control for a set of NICs included in the hardware interfaces 404. In such an example, the embedded VPN client 406 is integrated in the OS kernel application layer 412, and the OS kernel 206 prevents the applications APP 04-06 from accessing the set of NICs of the mobile device 102 (e.g., by disabling application layer access to the set of NICs). Additionally, the OS kernel 206 grants the embedded VPN client 406 exclusive access to the set of NICs. To enable the applications APP 04-06 to access the set of NICs, the embedded VPN client 406 logically creates and provides a virtual interface (e.g., such as a virtual NIC) to the applications APP 04-06.

For example, assume that application APP 04 is attempting to establish a network connection to a specific destination (e.g., host). For example, the application APP 04 could implement a web browser that is attempting to access a web site. To establish the network connection, the application APP 04 queries the OS kernel 206 for a set of available NICs via which network connections can be established. The embedded VPN client 406 detects or is otherwise made aware of this query and, in response, establishes a VPN connection with the specific network destination using one of the physical NICs selected in accordance with the access permissions determined (e.g., by the app policy engine 104) for the application APP 04. Also in response to the query by the application APP 04, the embedded VPN client 406 provides a list indicating that one NIC (e.g., a virtual NIC) is available and provides a virtual interface for interfacing with this one NIC. The virtual interface provided by the embedded VPN client 406 corresponds to the end point of the VPN tunnel established (e.g., via the network tunnel 217) with the specific network destination. The application APP 04 then establishes a network connection with the specific network destination (e.g., host/server) using the virtual interface.

In the preceding example, the embedded VPN client 406 is transparent to the application APP 04. In other words, the application APP 04 is unaware that its network connection with the specific network destination is being implemented by a VPN connection (tunnel) and that the ingress and egress IP packets being received and transmitted, respectively, over this network connection are undergoing encryption. Furthermore, the particular physical NIC being used to implement the network connection is unknown to the application APP 04. Instead, the application APP 04 perceives that the virtual NIC represented by the virtual interface provided by the embedded VPN client 406 is implementing the network connection to the specific network destination.

Such an embedded VPN client 406 can be advantageous over prior VPN clients executed, for example, at the application layer 204. For example, the embedded VPN client 406 can be executed persistently in the background (e.g., in a background process) and, thus, have always-on behavior such that the user applications APP 04-06 cannot bypass the embedded VPN client 406 when establishing network connections. In such an example, all network connections established by the mobile device 102 are VPN connections, which are secure and bond the mobile device 102 to one or more trusted hosts/servers (e.g., such as one or more security nodes) in the network (e.g., which can monitor and prevent malicious and/or unwanted data from being exchanged with the mobile device 102). The embedded VPN client 406 can also maintain connection persistence across different IP addresses and/or access technologies (e.g., to support mobile device mobility).

As another example, consider an example scenario in which the embedded program 408 included in the hardware access engine 402 corresponds to an embedded FES client 408 that is to provide access control for a set of memory interfaces (e.g., for internal memory, memory card(s), etc.) included in the hardware interfaces 404. In such an example, the embedded FES client 408 is integrated in the OS kernel application layer 412, and the OS kernel 206 prevents the applications APP 04-06 from accessing the set of memory interfaces of the mobile device 102 (e.g., by disabling application layer access to the set of memory interfaces). Additionally, the OS kernel 206 grants the embedded FES client 408 exclusive access to the set of memory interfaces. To enable the applications APP 04-06 to access the set of memory interfaces, the embedded FES client 408 logically creates and provides a virtual interface (e.g., such as a virtual memory interfaces) to the applications APP 04-06.

For example, assume that application APP 05 is attempting to store (e.g., write) data to a storage device of the mobile device 102. For example, the application APP 05 could implement an email client that is attempting to write an email attachment, such as a file, to memory. To store the data, the application APP 05 queries the OS kernel 206 for a set of available storage devices. The embedded FES client 408 detects or is otherwise made aware of this query and, in response, configures (e.g., selects) a particular memory interface associated with a particular one of the set of storage devices in accordance with the access permissions determined (e.g., by the app policy engine 104) for the application APP 05. The particular storage device is subject to file encryption as implemented by the FES client 408. Also in response to the query by the application APP 05, the embedded FES client 408 provides a list indicating that one storage device (e.g., a virtual storage device) is available and provides a virtual interface for interfacing with this one storage device. The application APP 05 then opens a file in the virtual storage device using the virtual interface and writes the data to the virtual interface for storage in the virtual storage device. The FES client 408 receives the data written by the application APP 05 to the virtual interface, encrypts the data (e.g., on-the-fly) and writes the encrypted data to the particular physical storage device configured (e.g., selected) by the FES client 408.

As another example, assume that application APP 05 is attempting to retrieve (e.g., read) data from a file stored in the mobile device 102. To read the data, the application APP 05 queries the OS kernel 206 for the location of the stored file. In response to the query by the application APP 05, the embedded FES client 408 determines the physical storage device in which the file is stored (e.g., based on access authorization and storage device configuration/selection performed previously during a memory write operation performed by the application APP 05). The embedded FES client 408 provides a virtual interface to the application APP 05 for interfacing with a virtual storage device that abstracts the physical storage device. The application APP 05 then opens a file in the virtual storage device using the virtual interface to retrieve the data. The FES client 408 retrieves the data from the physical memory device, decrypts the data (e.g., on-the-fly) and returns the encrypted data to the virtual interface for retrieval by the application APP 05.

Like the example embedded VPN client 406 described above, the example embedded FES client 408 can be advantageous over prior memory management techniques employed in mobile devices. For example, the embedded FES client 408 can be executed persistently in the background (e.g., in a background process) and, thus, have always-on behavior such that the user applications APP 04-06 cannot bypass the embedded FES client 408 when writing data to and/or retrieving data from storage device(s) in the mobile device 102. In such an example, all application (e.g., user) data stored in the mobile device 102 can be subject to encryption by the embedded FES client 408, thereby protecting the stored data from unauthorized access (e.g., by malicious code, malware, etc.).

Figure 5:
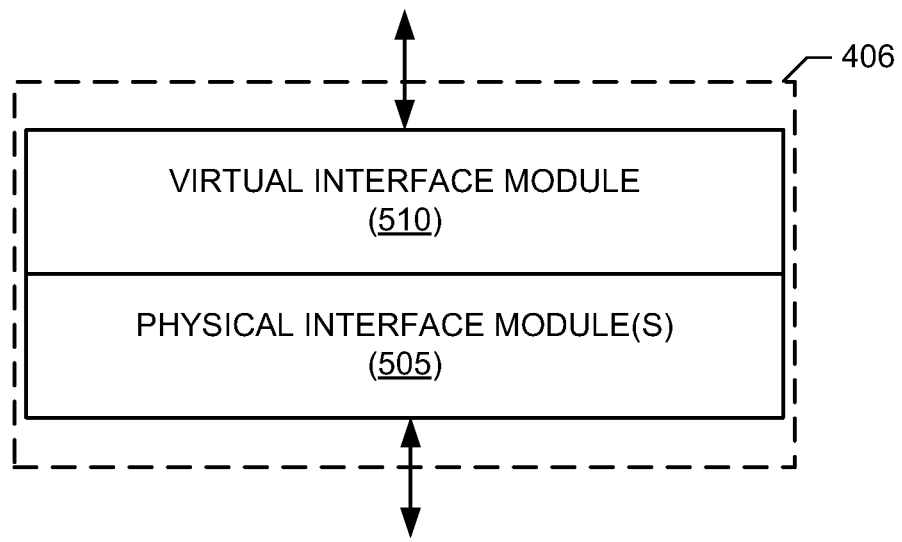
FIG. 5 shows a block diagram of the example embedded program included in the hardware access engine of FIG. 4.

A block diagram illustrating an example implementation of one of the embedded programs 406-410 of FIG. 4 is illustrated in FIG. 5. For clarity, the example implementation of FIG. 5 is described from the perspective of implementing the embedded program 406. However, the example of FIG. 5 could additionally or alternatively be used to implement the embedded programs 408 and/or 410.

Turning to FIG. 5, the example embedded program 406 illustrated therein includes one or more example physical interface modules 505 to interface with a set of one or more respective hardware interfaces 404 of the mobile device 102. The physical interface module(s) 505 can correspond to, for example, a set of NIC drivers for a respective set of NICs included in the mobile device 102, a set of memory drivers for a respective set of memory interfaces for storage devices in the mobile device 102, a set of user interface drivers for a respective set of user interfaces (e.g., microphone, speaker, keypad, touchscreen, camera, etc., interfaces) of the mobile device 102, etc.

The example embedded program 406 of FIG. 5 also includes an example virtual interface module 510 to implement a virtual interface to provide access to one (or more) of the physical interface module(s) 505. The virtual interface can represent, for example, a virtual NIC that abstracts and provides access to a particular physical NIC, a virtual storage device that abstracts and provides access to a particular physical storage device, a virtual user interface that abstracts and provides access to a particular physical user interface, etc. In some examples, the particular physical interface module or modules 505 to which the virtual interface 510 provides access is (are) configured based on an application's access permissions, as described above. Also, in some example, the virtual interface module 510 implements one or more data processing operations (e.g., such as data encryption/decryption, VPN tunnel establishment, etc.) between the virtual interface provided by the virtual interface module 510 and the particular hardware (physical) interface(s) to which the virtual interface provides access. As described above, such processing by the virtual interface module 510 and the particular hardware interface(s) to which the virtual interface module 510 provides access may be transparent to (e.g., unknown by) an application using the embedded program 406 to gain access to the hardware interfaces 404 of the mobile device 102.

While an example app policy engine 104 has been illustrated in FIGS. 1-3, one or more of the servers, platforms, interfaces, data structures, elements, processes and/or devices illustrated in FIGS. 1-3 may be combined, divided, re-arranged, omitted, eliminated and/or implemented in any way.

Further, the example VPN client 210, the example MAC module 212, the example application execution unit 302, the example certificate processor 304, the example database 306, the example policy processor 308 and/or more generally, the example app policy engine 104 may be implemented by hardware, software, firmware and/or any combination of hardware, software and/or firmware. Thus, for example, any of the example VPN client 210, the example MAC module 212, the example application execution unit 302, the example certificate processor 304, the example database 306, the example policy processor 308 and/or more generally, the example app policy engine 104 could be implemented by one or more circuit(s), programmable processor(s), application specific integrated circuit(s) (ASIC(s)), programmable logic device(s) (PLD(s)) and/or field programmable logic device(s) (FPLD(s)), etc.

While an example hardware access engine 402 has been illustrated in FIGS. 4-5, one or more of the servers, platforms, interfaces, data structures, elements, processes and/or devices illustrated in FIGS. 4-5 may be combined, divided, re-arranged, omitted, eliminated and/or implemented in any way. Further, the example embedded programs 406, 408 and/or 410, the example physical interface module(s) 505, the example virtual interface module 510 and/or more generally, the example hardware access engine 402 may be implemented by hardware, software, firmware and/or any combination of hardware, software and/or firmware. Thus, for example, any of the example embedded programs 406, 408 and/or 410, the example physical interface module(s) 505, the example virtual interface module 510 and/or more generally, the example hardware access engine 402 could be implemented by one or more circuit(s), programmable processor(s), ASIC(s), PLD(s) and/or FPLD(s), etc.

When any apparatus claim of this patent is read to cover a purely software and/or firmware implementation, at least one of the example VPN client 210, the example MAC module 212, the example application execution unit 302, the example certificate processor 304, the example database 306, the example policy processor 308, the example hardware access engine 402, the example embedded programs 406, 408 and/or 410, the example physical interface module(s) 505 and/or the example virtual interface module 510 are hereby expressly defined to include a computer readable medium such as a memory, DVD, CD, etc. storing the software and/or firmware. Further still, the example app policy engine 104 and/or the example hardware access engine 402 may include one or more elements, processes and/or devices in addition to, or instead of, those illustrated in FIGS. 1-5, and/or may include more than one of any or all of the illustrated elements, processes and devices.

FIGS. 6A-B and 7-9 depict example flow diagrams representative of processes that may be implemented using, for example, computer readable instructions that may be used to control privileges of mobile device applications, including to control hardware interface access by mobile device application. The example processes of FIGS. 6A-B and 7-9 may be performed using a processor, a controller and/or any other suitable processing device. For example, the example processes of FIGS. 6A-B and 7-9 may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example processes of FIGS. 6A-B and 7-9 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIGS. 6A-B and 7-9 may be implemented using any combination(s) of ASIC(s), PLD(s), FPLD(s), discrete logic, hardware, firmware, etc. Also, some or all of the example processes of FIGS. 6A-B and 7-9 may be implemented manually or as any combination(s) of any of the foregoing techniques, for example, any combination of firmware, software, discrete logic and/or hardware. Further, although the example processes of FIGS. 6A-B and 7-9 are described with reference to the flow diagrams of FIGS. 6A-B and 7-9, other methods of implementing the processes of FIGS. 6A-B and 7-9 may be employed. For example, the order of execution of the blocks may be changed, and/or some of the blocks described may be changed, eliminated, sub-divided, or combined. Additionally, any or all of the example processes of FIGS. 6A-B and 7-9 may be performed sequentially and/or in parallel by, for example, separate processing threads, processors, devices, discrete logic, circuits, etc.

Figure 6A:
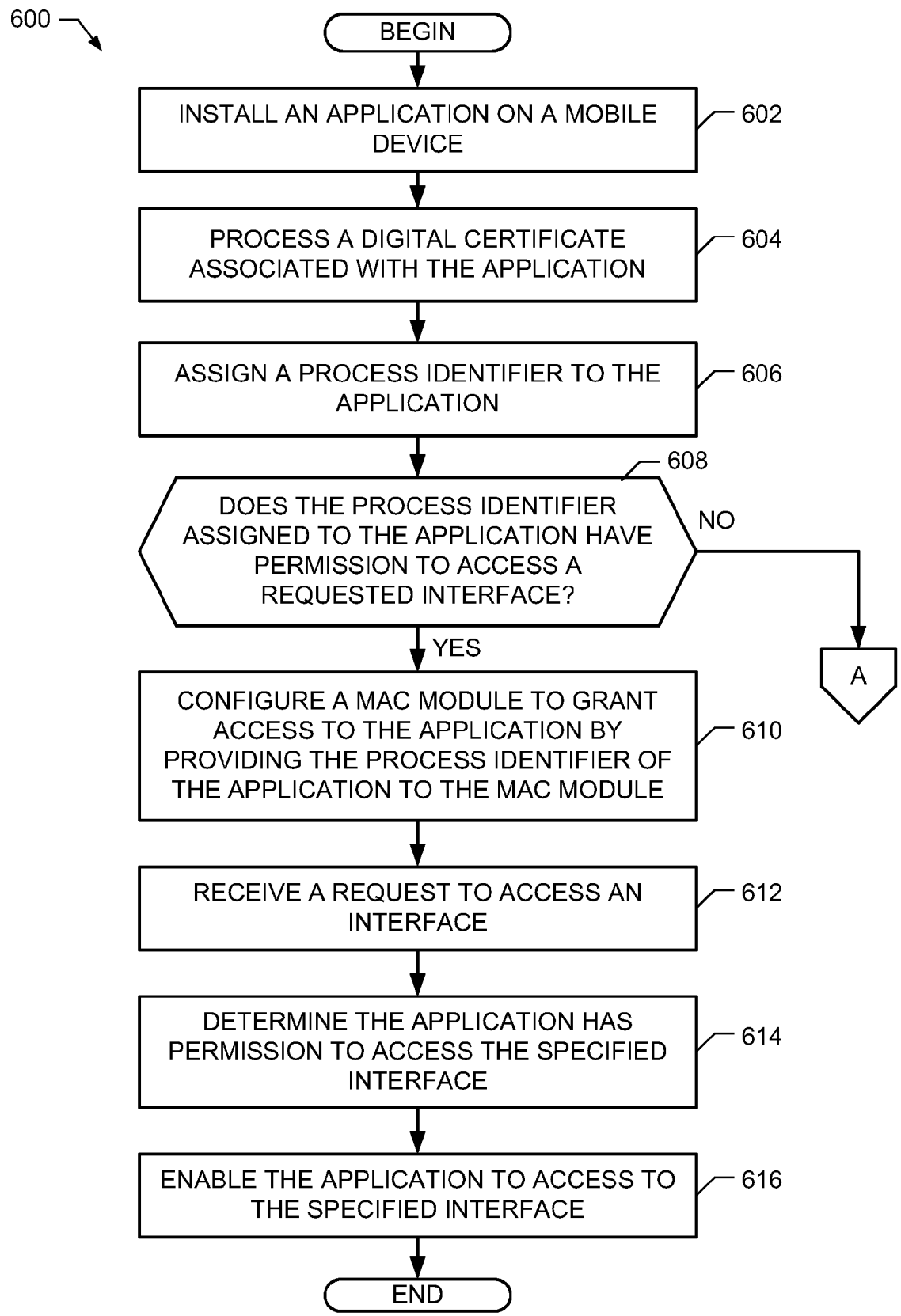
FIGS. 6A and 6B collectively form a flowchart representative of example machine-accessible instructions that may be executed to implement the app policy engine of FIGS. 1-3.
Figure 6B:
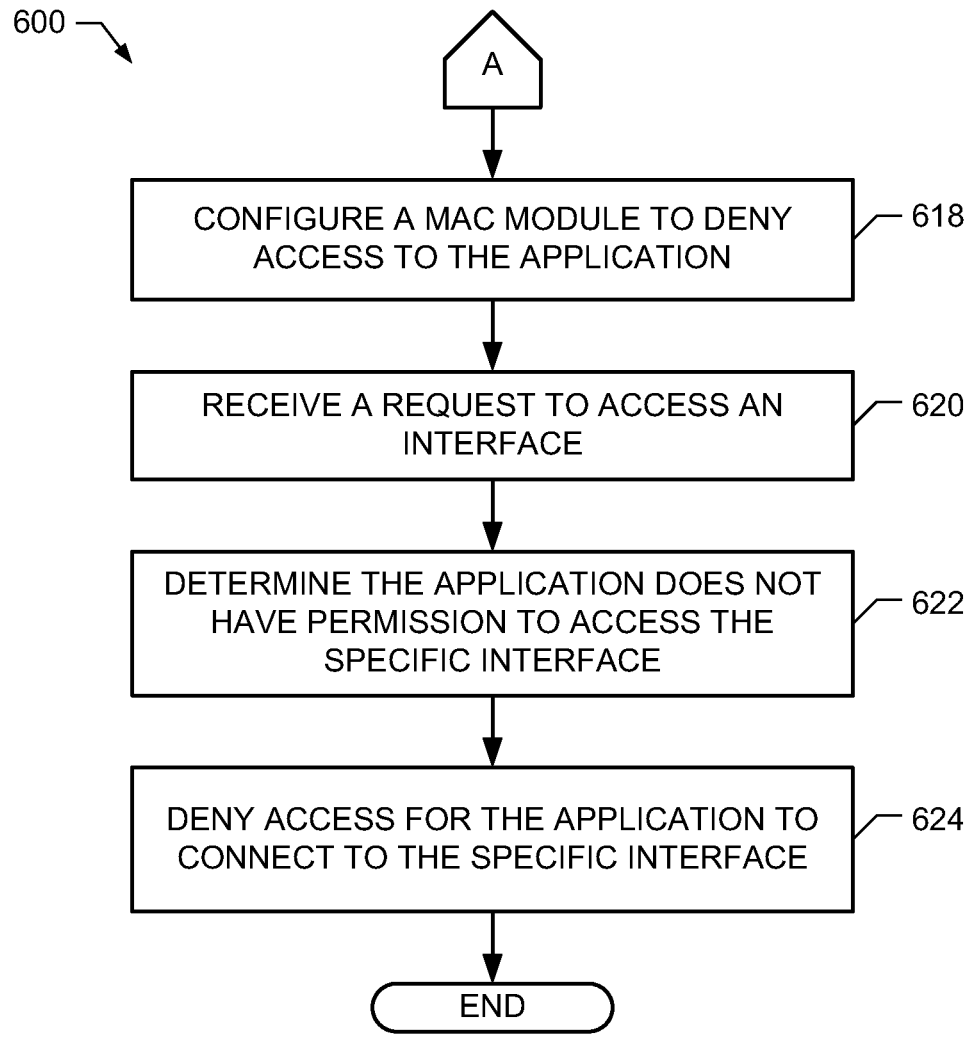

The example process 600 of FIGS. 6A and 6B controls privileges of mobile device applications via the app policy engine 104 of FIGS. 1-3. While the example process 600 provides access control for an application, the example process 600 may provide access control for multiple applications attempting to access device and/or network interfaces on a mobile device. Further, the example process 600 may provide access control for application(s) attempting to access multiple wireless networks, VPNs, and/or host service platforms. Further, while the example process 600 provides access control, the example process 600 may provide execution control for any of the applications on a mobile device.

The example process 600 of FIG. 6A begins by installing an application on a mobile device (e.g., the mobile device 102 of FIGS. 1-2) (block 602). The example app policy engine 104 then processes a digital certificate associated with the application (block 604). In many examples, the application includes the digital certificate, which specifies if the application is authorized to be executed on the mobile device 102 and/or specifies which device and/or network interfaces the application is authorized to access. In other examples, the digital certificate may be processed from, for example, a SIM card within the mobile device 102. In yet other example, the app policy engine 104 may request the digital certificate from a certificate authority and/or a service provider prior to processing the certificate.

The example process 600 of FIG. 6A continues by the example application execution unit 302 and/or an operating system assigning a process identifier to the application (block 606). The example certificate processor 304 and/or the policy processor 308 then determines if the application is identified within a digital certificate as an authorized application (block 608). The example certificate processor 304 and/or the policy processor 308 may determine a relative amount of privileges granted to the application and identity which device and/or network interfaces the application is authorized to access. If privileges for the application are specified within the certificate, the example policy processor 308 next configures, for example, the MAC module 212 of FIGS. 2 and 3 (block 610).

To configure the MAC module 212, the policy processor 308 sends to the MAC module 212 an instruction including the process identifier of the application to cause the MAC module 212 to authorize and/or grant privileges to the application to execute and/or access device and/or network interfaces. The privileges may also specify that the application may access a VPN, a wireless network, and/or a host service platform. Additionally, if the application is associated with a digital certificate, the example certificate processor 304 stores an identifier of the application and/or the corresponding process identifier to the example database 306.

The example process 600 of the illustrated example continues by the VPN client 210 receiving a request from the mobile device 102 that the application is attempting to execute and/or access a wireless network, VPN, and/or host service platform (e.g., access a device and/or network interface) (block 612). The example MAC module 212 uses the process identifier of the application to determine that the application has permission and/or is authorized to access the specified interface (block 614). The example network tunnel 217 may also create a VPN tunnel from the VPN client 210 to an appropriate wireless hardware interface of the mobile device 102. The example MAC module 212 then enables the application to access the specified interface by allowing communications associated with the application to propagate through the VPN tunnel (block 616). The example process 600 then terminates. In other examples, the example process 600 may return to detecting that an application is installed on the mobile device 102 (block 602).

However, if the example certificate processor 304 and/or the policy processor 308 identifies that the application is not included within a digital certificate as an authorized application (block 608), the example process 600 of FIG. 6B continues by the policy processor 308 configuring the MAC module 212 to deny execution access and/or interface access to the application (block 618). In some examples, the policy processor 308 may instruct the MAC module 212 to deny access by providing the process identifier of the application to the MAC module 212 with an instruction to deny communications associated with the process identifier. In other examples, the policy processor 308 may deny access to an application by not sending the process identifier of the application to the MAC module 212.

The example process 600 of the illustrated example continues by the VPN client 210 receiving a request from the mobile device 102 that the application is attempting to execute and/or access a device and/or network interface (block 620). The example MAC module 212 determines that the application is not authorized to execute and/or access the specified interface (block 622). The example MAC module 212 then denies the application access to connect to specified interface and/or to execute (block 624). The example process 600 then terminates. In other examples, the example process 600 may return to detecting that an application is installed on the mobile device 102 (block 602).

Figure 7:
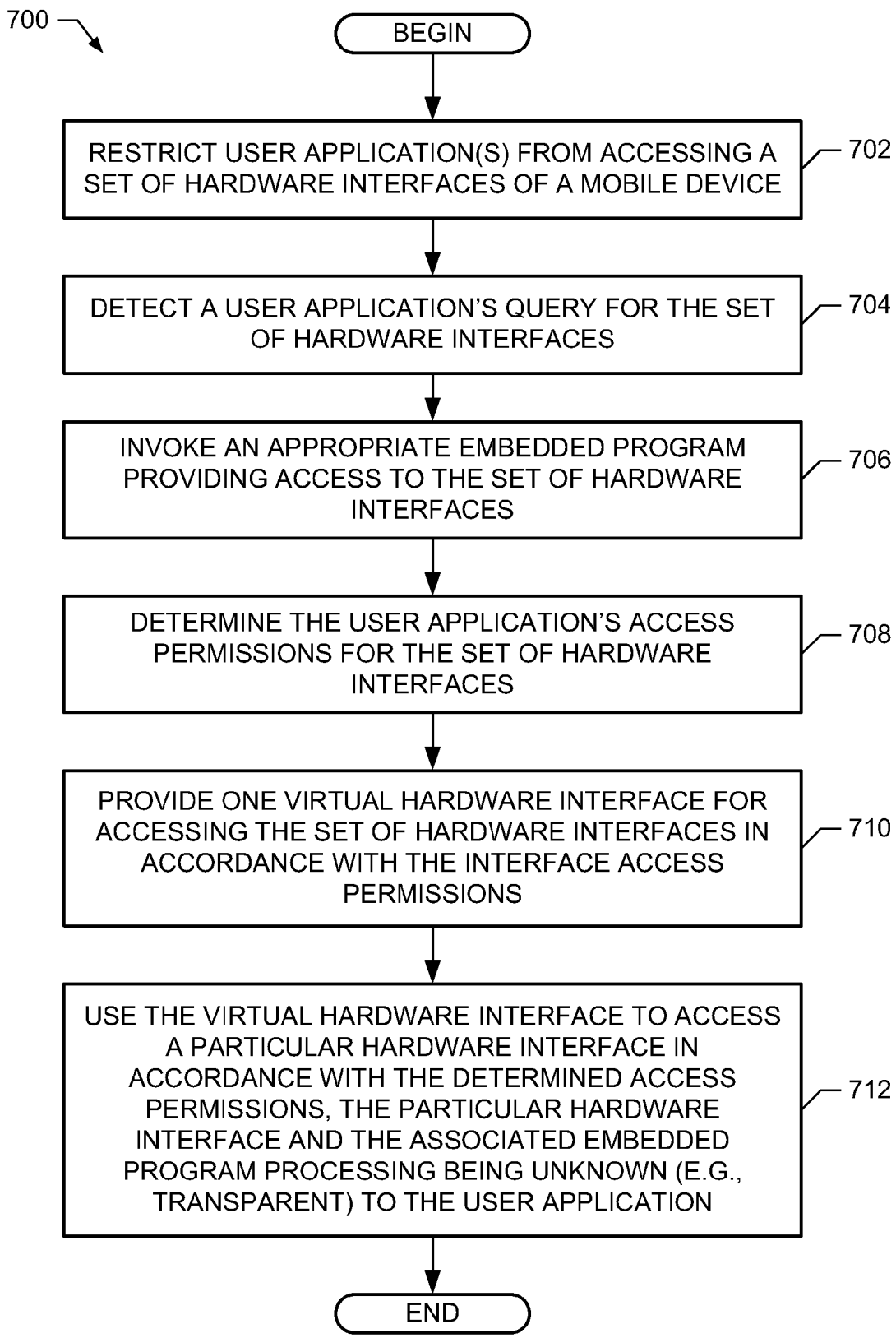
FIG. 7 is a flowchart representative of first example machine-accessible instructions that may be executed to implement the hardware access engine of FIGS. 4-5.

The example process 700 of FIG. 7 controls hardware interface access by mobile applications using the hardware access engine 402. With reference to the preceding figures, the process 700 begins with the OS kernel 206 restricting user applications APP 04-04 from accessing a set of hardware interfaces (which may be all or a subset of the hardware interfaces 404) of the mobile device 102 (block 702). The OS kernel 206 then detects a query from one of the user applications APP 04-06 for the set of hardware interfaces (block 704).

For clarity, the description of FIG. 7 assumes that the application APP 04 makes the query for the set of hardware interfaces that is detected at block 704. In response to detecting the query, the OS kernel 206 invokes the appropriate embedded program 406-410 of the hardware access engine 402 that provides access to the set of hardware interfaces associated with (e.g., referenced by) the query detected at block 704. For clarity, the description of FIG. 7 assumes that the embedded program 406 is invoked by the OS kernel 206 at block 706. In some examples, the app policy engine 104 determines access permissions for the application APP 04 to determine which, if any, of the set of hardware interfaces the application APP 04 is permitted to access (block 708).

Next, in response to the query from the application APP 04, the invoked embedded program 406 provides one virtual interface to the application APP 04 via which the application APP 04 can access the set of hardware interfaces in accordance with any access permissions determined by the app policy engine 104 (block 710). Assuming the application APP 04 is authorized to access at least one of the hardware interfaces and, thus, is provided the virtual interface at block 710, the application APP 04 then uses this virtual interface to access a particular hardware interface from the set of hardware interfaces (block 712). For example, the embedded program 406 may configure (e.g., select) the particular hardware interface that is accessible via the virtual interface based on the access permissions determined at block 708. Also, as described above, the particular hardware interface accessible via the virtual interface, as well as any associated virtual interface processing, is transparent (e.g., unknown) to the application APP 04 using the virtual interface to access the set of hardware interfaces. The process 700 then ends.

Figure 8:
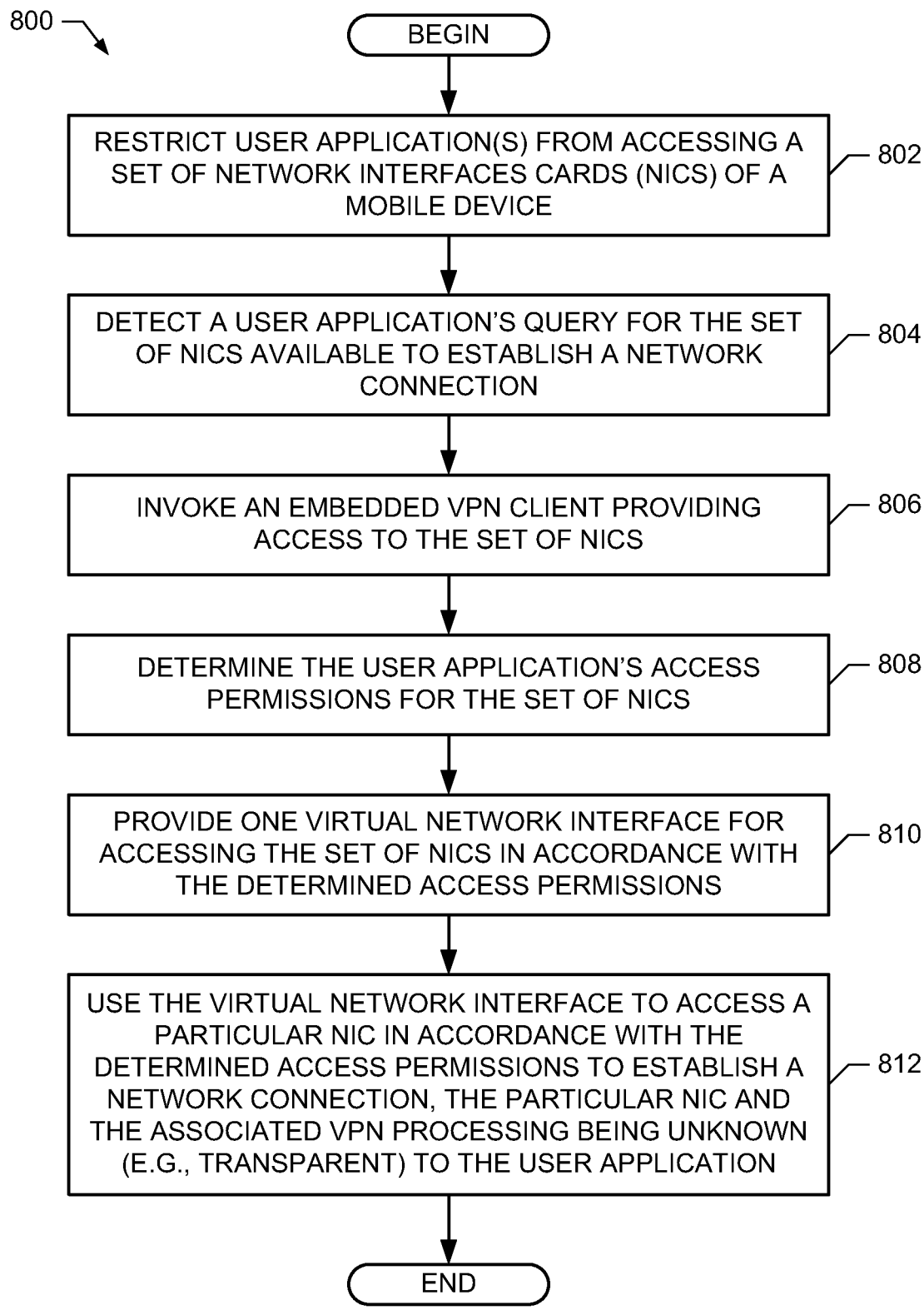
FIG. 8 is a flowchart representative of second example machine-accessible instructions that may be executed to implement the hardware access engine of FIGS. 4-5.

The example process 800 of FIG. 8 controls NIC interface access by mobile applications using the hardware access engine 402. With reference to the preceding figures, the process 800 begins with the OS kernel 206 restricting user applications APP 04-06 from accessing a set of NICs of the mobile device 102 (block 802). For example, the mobile device 102 may include multiple NICs capable of connecting the mobile device 102 with different networks 106-108. The OS kernel 206 then detects a query from one of the user applications APP 04-06 for the set of NICs that are available to establish a network connection (block 804). For clarity, the description of FIG. 8 assumes that the application APP 04 makes the query for the set of NICs that is detected at block 804. In response to detecting the query, the OS kernel 206 invokes an embedded VPN client of the hardware access engine 402 that provides access to the set of NICs. For clarity, the description of FIG. 8 assumes that the embedded program 406 corresponds to an embedded VPN client 406. In the illustrated example, the app policy engine 104 determines access permissions for the application APP 04 to determine which, if any, of the set of NICs the application APP 04 is permitted to access (block 808).

Next, in response to the query from the application APP 04, the embedded VPN client 406 provides one virtual interface to the application APP 04 via which the application APP 04 can access the set of NICs in accordance with the access permissions determined by the app policy engine 104 (block 810). Assuming the application APP 04 is authorized to access at least one of the NICs and, thus, is provided the virtual interface at block 810, the application APP 04 then uses this virtual interface to access a particular NIC from the set of NICs (block 812). For example, the embedded VPN client 406 may configure (e.g., select) the particular physical NIC that is accessible via the virtual interface based on the access permissions determined at block 808. Also, as described above, the particular physical NIC accessible via the virtual interface, as well as any VPN processing performed by the embedded VPN client 406, is transparent (e.g., unknown) to the application APP 04 using the virtual interface to access the set of NICs. The process 800 then ends.

Figure 9:
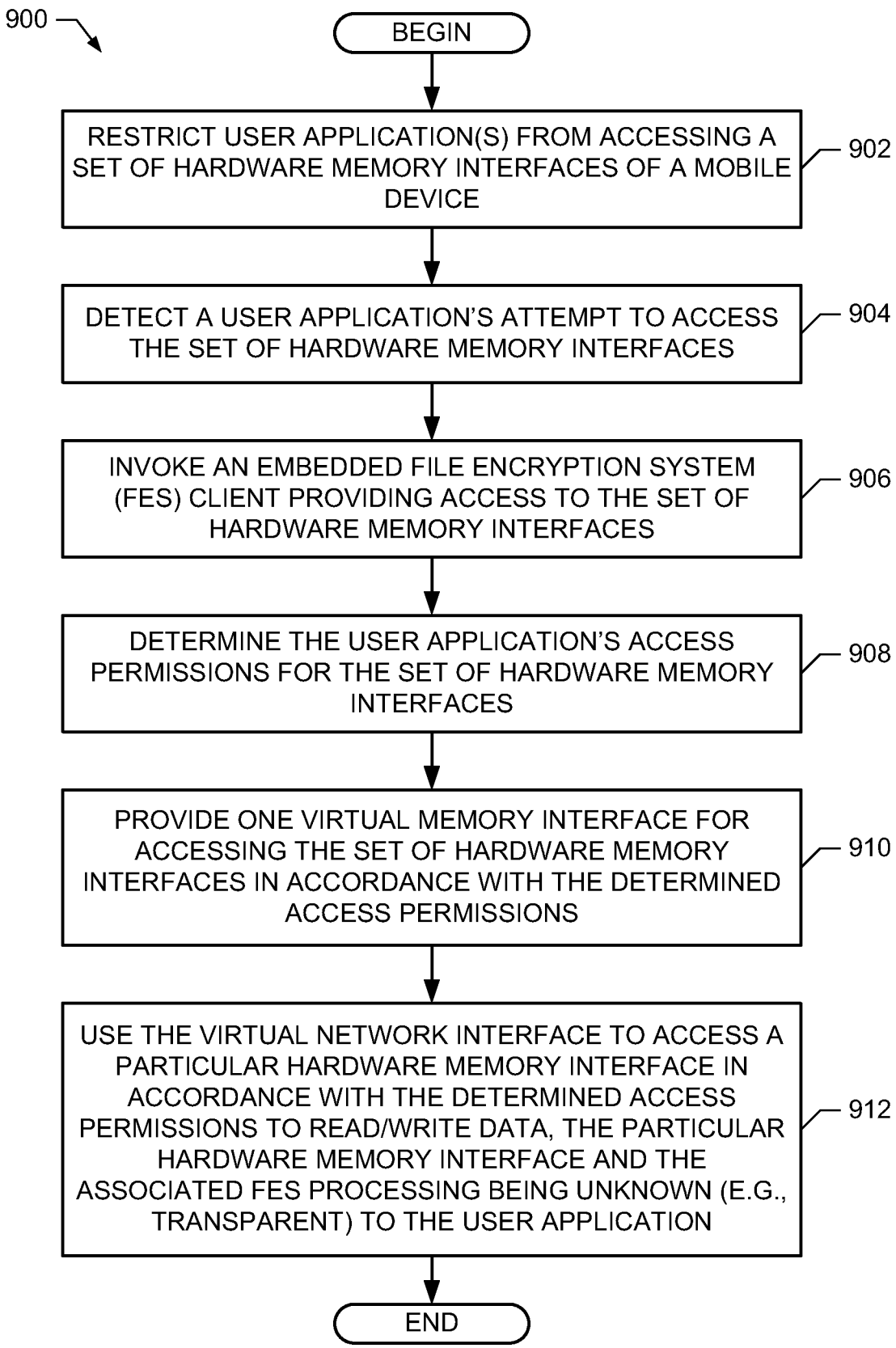
FIG. 9 is a flowchart representative of third example machine-accessible instructions that may be executed to implement the hardware access engine of FIGS. 4-5.

The example process 900 of FIG. 9 controls memory interface access by mobile applications using the hardware access engine 402. With reference to the preceding figures, the process 900 begins with the OS kernel 206 restricting user applications APP 04-06 from accessing a set of memory interfaces of the mobile device 102 (block 902). For example, the mobile device 102 may include a set of memory interfaces for a respective set of memory devices included in the mobile device 102. The OS kernel 206 then detects one of the user applications APP 04-06 attempting to access the set of memory interfaces (block 904). For clarity, the description of FIG. 9 assumes that the application APP 05 is attempting to access the set of memory interfaces at block 904. In response to detecting the query, the OS kernel 206 invokes an embedded FES client of the hardware access engine 402 that provides access to the set of memory interfaces. For clarity, the description of FIG. 9 assumes that the embedded program 408 corresponds to an embedded FES client 408. In the illustrated example, the app policy engine 104 determines access permissions for the application APP 05 to determine which, if any, of the set of memory interfaces the application APP 05 is permitted to access (block 908).

Next, in response to the access attempt by the application APP 05, the embedded FES client 408 provides one virtual interface to the application APP 05 via which the application APP 05 can access the set of memory interfaces in accordance with the access permissions determined by the app policy engine 104 (block 910). Assuming the application APP 05 is authorized to access at least one of the memory interfaces and, thus, is provided the virtual interface at block 910, the application APP 05 then uses this virtual interface to access a particular memory interface from the set of memory interfaces (block 912). For example, the embedded FES client 408 may configure (e.g., select) the particular physical memory interface that is accessible via the virtual interface based on the access permissions determined at block 908. Also, as described above, the particular physical memory interface accessible via the virtual interface, as well as any file encryption processing performed by the embedded FES client 408, is transparent (e.g., unknown) to the application APP 05 using the virtual interface to access the set of memory interfaces. The process 900 then ends.

Figure 10:
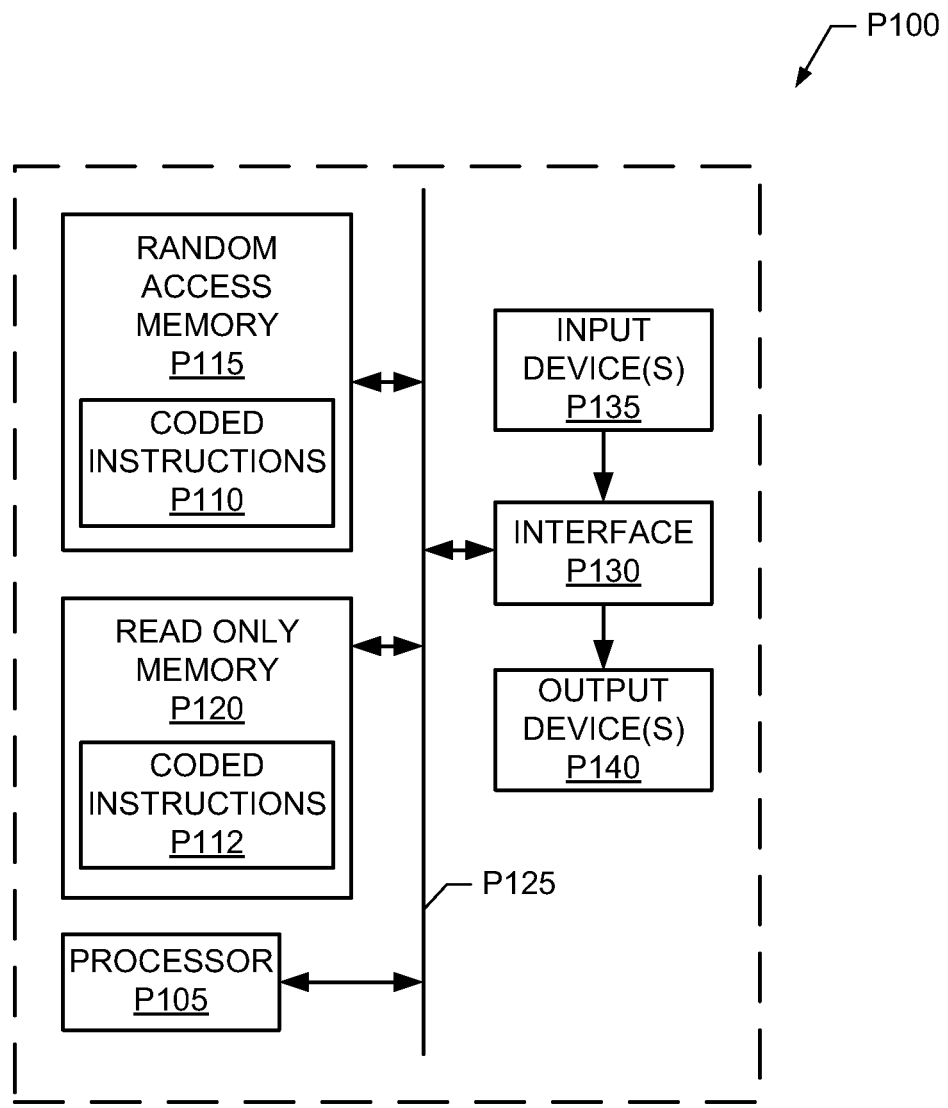
FIG. 10 is a block diagram of an example processor platform that may be used and/or programmed to execute the example processes and/or the example machine-accessible instructions of FIGS. 6A-B, 7, 8 and/or 9 to implement any or all of the example methods, apparatus and/or articles of manufacture described herein.

FIG. 10 is a schematic diagram of an example processor platform P100 that may be used and/or programmed to implement the example VPN client 210, the example MAC module 212, the example application execution unit 302, the example certificate processor 304, the example database 306, the example policy processor 308 and/or more generally, the example app policy engine 104 of FIGS. 1-3. Additionally or alternatively, the example processor platform P100 may be used and/or programmed to implement the example embedded programs 406, 408 and/or 410, the example physical interface module(s) 505, the example virtual interface module 510 and/or more generally, the example hardware access engine 402 of FIGS. 4-5. For example, the processor platform P100 can be implemented by one or more general-purpose processors, processor cores, microcontrollers, etc.

The processor platform P100 of the example of FIG. 10 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example processes of FIGS. 6A-B, 7, 8 and/or 9 to implement the example methods and apparatus described herein.

The processor P105 is in communication with the main memory (including a ROM P120 and/or the RAM P115) via a bus P125. The RAM P115 may be implemented by DRAM, SDRAM, and/or any other type of RAM device, and ROM may be implemented by flash memory and/or any other desired type of memory device. Access to the memory P115 and the memory P120 may be controlled by a memory controller (not shown). One or both of the example memories P115 and P120 may be used to implement the example database 306 of FIG. 3.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:

implementing a virtual interface capable of providing applications on a mobile device with access to any network interface in a set of network interfaces, the applications restricted from accessing the network interfaces without using the virtual interface, the virtual interface provided by a virtual private network client executing in a kernel layer of an operating system of the mobile device;

configuring, by the virtual private network client, the virtual interface to form a first virtual interface for a first application on the mobile device to cause a first network interface in the set of network interfaces to be made accessible to the first application, the first network interface being selected by the virtual private network client for the first application from the set of network interfaces based on an access permission associated with the first application and in response to detection of a query from the first application for a list of available network interfaces, the first network interface that is selected and made accessible to the first application via the first virtual interface being unknown to the first application; and providing the first application with access to the first network interface via the first virtual interface after the virtual private network client has established a virtual private network connection with a first destination, the virtual private network client to establish the virtual private network connection in response to the detection of the query from the first application for the list of available network interfaces, wherein the first application executes in at least one of an application layer of the operating system different from the kernel layer of the operating system or in a network accessible by the mobile device, and the virtual private network client executes persistently in a background process.

2. The method as defined in claim 1, further comprising:

providing a second virtual interface to a second application if the second application is permitted to access at least one of the network interfaces; and not providing the second virtual interface to the second application if the second application is not permitted to access any of the set of network interfaces.

3. The method as defined in claim 1, further comprising:

providing a second virtual interface to a second application, the second virtual interface to be configured for the second application to cause a second network interface in the set of network interfaces to be selected and made accessible to the second application, the second network interface that is selected and made accessible to the second application via the second virtual interface being unknown to the second application, the second network interface being different from the first network interface.

4. The method as defined in claim 1, wherein the first virtual interface corresponds to an endpoint of a virtual private network tunnel.

5. The method as defined in claim 1, wherein the set of network interfaces includes network interfaces to respectively interface with a cellular network and a WiFi network.

6. The method as defined in claim 1, further comprising monitoring the virtual private network connection with a virtual private network tap executing in the kernel layer of the operating system of the mobile device.

7. A tangible computer readable storage device comprising machine readable instructions that, when executed, cause a machine to perform operations comprising:

implementing a virtual interface capable of providing applications with access to any network interface in a set of network interfaces, the applications restricted from accessing the network interfaces without using the virtual interface, the virtual interface provided by a virtual private network client executing in a kernel layer of an operating system of the mobile device;

configuring the virtual interface to form a first virtual interface for a first application on the mobile device to cause a first network interface in the set of network interfaces to be made accessible to the first application, the first network interface to be selected for the first application from the set of network interfaces based on an access permission associated with the first application and in response to detection of a query from the first application for a list of available network interfaces, the first network interface that is selected and made accessible to the first application via the first virtual interface being unknown to the first application; and providing the first application with access to the first network interface via the first virtual interface after the virtual private network client has established a virtual private network connection with a first destination, the virtual private network client to establish the virtual private network connection in response to the detection of the query from the first application for the list of available network interfaces, wherein the application is to execute in at least one of an application layer of the operating system different from the kernel layer of the operating system or in a network accessible by the mobile device, and the virtual private network client is to execute persistently in a background process.

8. The tangible computer readable storage device as defined in claim 7, wherein the operations further comprise:

providing a second virtual interface to a second application if the second application is permitted to access at least one of the network interfaces; and not providing the second virtual interface to the second application if the second application is not permitted to access any of the set of network interfaces.

9. The tangible computer readable storage device as defined in claim 7, wherein the operations further comprise:

providing a second virtual interface to a second application, the second virtual interface to be configured for the second application to cause a second network interface in the set of network interfaces to be selected and made accessible to the second application, the second network interface that is selected and made accessible to the second application via the second virtual interface being unknown to the second application, the second network interface being different from the first network interface.

10. The tangible computer readable storage device as defined in claim 7, wherein the first virtual interface corresponds to an endpoint of a virtual private network tunnel.

11. The tangible computer readable storage device as defined in claim 7, wherein the set of network interfaces includes network interfaces to interface respectively with a cellular network and a WiFi network.

12. The tangible computer readable storage device as defined in claim 7, wherein the operations further comprise monitoring the virtual private network connection with a virtual private network tap executing in the kernel layer of the operating system of the mobile device.

13. A mobile device comprising:

a set of network interfaces;

a first memory having machine readable instructions stored thereon;

a processor to execute the instructions to perform operations comprising:

determining whether a first application on the mobile device is authorized to access any of the network interfaces in the set;

implementing a virtual interface capable of providing applications with access to any network interface in the set of network interfaces, the virtual interface to be provided by a virtual private network client integrated in a kernel layer of an operating system of the mobile device;

instantiating a first instance of the virtual interface for the first application, the first instance of the virtual interface to cause a first network interface in the set of network interfaces to be made accessible to the first application, the first network interface to be selected for the first application from the set of network interfaces based on an access permission associated with the first application and in response to detection of a query from the first application for a list of available network interfaces, the first network interface that is selected and made accessible to the first application via the first instance of the virtual interface being unknown to the first application, but being one of a first subset of network interfaces the first application is permitted to access; and providing the first application with access to the first network interface via the first instance of the virtual interface after the virtual private network client has established a virtual private network connection with a first destination, the virtual private network client to establish the virtual private network connection in response to the detection of the query from the first application for the list of available network interfaces, wherein the first application is to execute in at least one of an application layer of the operating system different from the kernel layer of the operating system or in a network accessible by the mobile device, and the virtual private network client is to execute persistently in a background process.

14. The mobile device as defined in claim 13, wherein the operations further comprise processing a digital certificate to determine whether the first application is authorized to access any of the network interfaces in the set.

15. The mobile device as defined in claim 13, wherein the first instance of the virtual interface corresponds to an endpoint of a virtual private network tunnel established by the virtual private network client.

16. The mobile device as defined in claim 13, wherein the set of network interfaces includes network interfaces to interface respectively with a cellular network and a WiFi network.

17. The mobile device as defined in claim 13, wherein the operations further comprise monitoring the virtual private network connection with a virtual private network tap executing in the kernel layer of the operating system of the mobile device.

* * * * *